United States Patent [19]

Hyodo et al.

[11] Patent Number: 5,067,123
[45] Date of Patent: Nov. 19, 1991

[54] SYSTEM FOR CONTROLLING DATA TRANSMISSION IN ATM SWITCHING NETWORK

[75] Inventors: Ryuji Hyodo, Kawasaki; Eisuke Iwabuchi, Yokohama; Tetsuo Nishino, Kawasaki; Osamu Isono, Kawasaki; Tetsuo Tachibana, Kawasaki; Toshimasa Fukui, Yokohama, all of Japan

[73] Assignee: Fujitsu Limited, Kawasaki, Japan

[21] Appl. No.: 547,198

[22] Filed: Jul. 3, 1990

[30] Foreign Application Priority Data

Jul. 3, 1989 [JP] Japan .................................. 1-169772

[51] Int. Cl.$^5$ ............................................... H04J 3/02
[52] U.S. Cl. .................................... 370/58.1; 370/94.1; 370/58.2; 370/60
[58] Field of Search .................... 370/60, 60.1, 94.1, 370/94.2, 94.3, 58.1, 58.2, 58.3

[56] References Cited

U.S. PATENT DOCUMENTS

| 4,484,324 | 11/1984 | Orsic | 370/58.3 |
| 4,845,704 | 7/1989 | Georgiou et al. | 370/60 |
| 4,875,208 | 10/1989 | Furuhashi et al. | 370/60 |
| 4,905,231 | 2/1990 | Leung et al. | 370/94.1 |
| 4,947,388 | 8/1990 | Kuwahara et al. | 370/60 |

OTHER PUBLICATIONS

Andrew S. Tannenbaum, Computer Networks, 2nd ed., Prentice Hall, 1988, sec. 6.2.4, pp. 401-403.

Primary Examiner—Douglas W. Olms
Assistant Examiner—Min Jung
Attorney, Agent, or Firm—Staas & Halsey

[57] ABSTRACT

A transmission control system in which terminals are connected to an ATM switching network, has a table circuit registering virtual channels presently formed in the ATM switching network in a management table, and a retrieval part for receiving a communication request from one of the terminals and for determining whether or not the management table registers a virtual channel corresponding to the communication request. Data output from one of the terminals is transferred to a different one of the terminals addressed by the communication request through the virtual channel corresponding to the communication request and corresponding two of the terminal adapters, when the retrieval part determines that the management table has the virtual channel corresponding to the communication request. A virtual channel setting part registers the virtual channel corresponding to the communication request in the management tabele, when the retrieval processor determines that the management table does not have the virtual channel corresponding to the communication request. Data output from the one of the terminals is transferred to the different one of the terminals addressed by the communication request through the virtual channel registered in the management table by the virtual channel setting part.

43 Claims, 17 Drawing Sheets

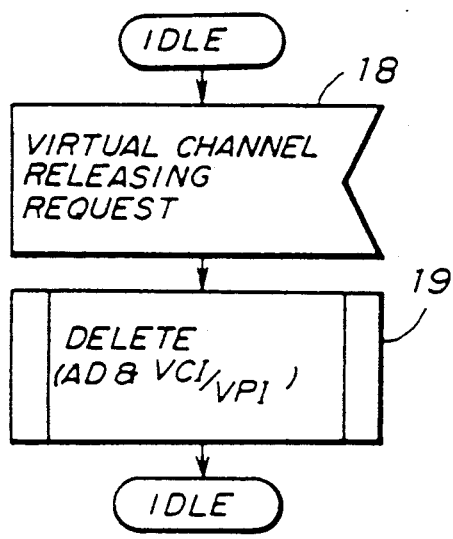
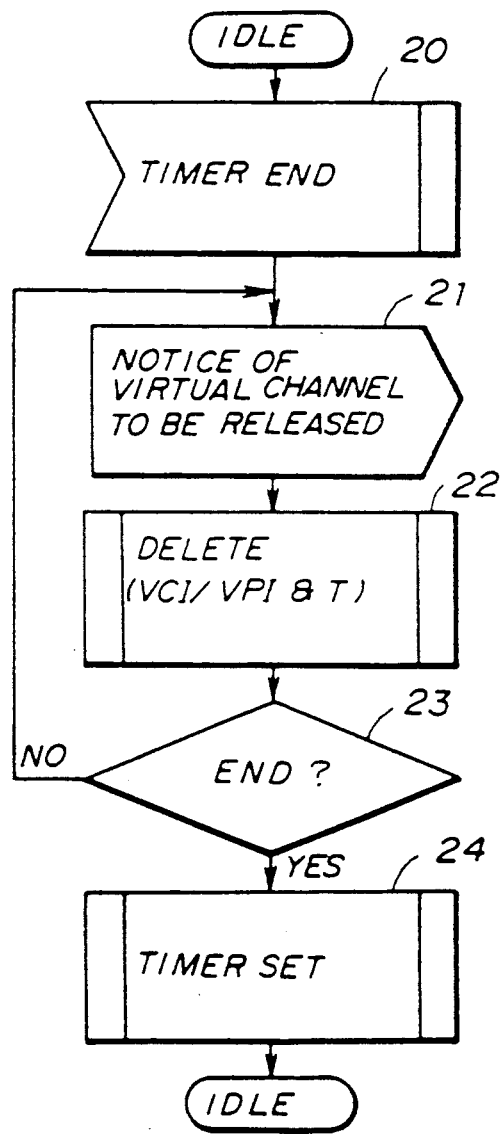
FIG.7
FIG.8

SYSTEM FOR CONTROLLING DATA TRANSMISSION IN ATM SWITCHING NETWORK

BACKGROUND OF THE INVENTION

The present invention generally relates to a system for controlling data transmission in an ATM (asynchronous transfer mode) switching network.

There is known an ATM switching network in which data is transferred in an asynchronous transfer mode. In the ATM switching network, data is divided into predetermined-length data pieces. A header is added to each predetermined-length data piece so that a cell is formed. In the ATM system, cells are transferred. ATM switching networks realize connection oriented services. Thus, ATM switching networks have advantages presented by the line switching and packet switching. However, ATM switching networks are not oriented to connectionless services as provided by packet switching.

In order to realize connectionless services by using an ATM switching network, it is necessary to define a fixed virtual channel in the ATM switching system since the ATM switching network is a connection-oriented services network, as described above.

Referring to FIG.1, an ATM switching network 63 is provided with a handler 62. A plurality of terminal equipment devices (hereinafter simply referred to as terminals) 61-1 - 61-n are coupled to the ATM switching network 63. It will be noted that for the sake of simplicity, terminal adapters, which derive predetermined-length cells from data and execute the reverse process, are omitted from the illustration. The handler 62 sets addresses of the terminals 61-1 - 61-n on the ATM switching network 63 and corresponding fixed virtual channels (illustrated by the broken lines) by using a network management function. It will be noted that virtual channels are called virtual circuits for packet data. Further, the handler 62 assigns virtual channel identification numbers to the terminals 61-1 - 61-n.

Each of the terminals 61-1 - 61-n divides data into cells, each including the called party address, by using the virtual channel identification number assigned to the sending terminal, and sends the cells to the handler 62 through the ATM switching network 63. The handler 62 assembles received cells and identifies the called party address from the assembled original data. Then, the handler 62 seeks a corresponding virtual channel based on the identified party address. After that, the handler 62 divides the assembled data into cells again by using the virtual channel identification number of the related virtual channel, and sends the cells to the destination terminal. With the above-mentioned arrangement, it is possible to transfer data between the terminals through the ATM switching network 63 by the connection-oriented services as provided by the packet switching system.

Referring to FIG.2, a plurality of terminals 64-1 - 64-n are connected to an ATM switching network 65. It will be noted that no handler is coupled to the ATM switching network. Fixed virtual channels illustrated by broken lines are provided between each pair of terminals which may communicate with each other. It can be considered that the system shown in FIG.2 distribute the function of the handler 62 shown in FIG.1 to the terminals 64-1-64-n. The terminals can communicate with each other through the fixed virtual channels via which cells are transferred.

However, the conventional system shown in FIG.1 has the disadvantages described below. It is necessary to provide the number of virtual channels equal to the number of terminals accommodated in the ATM switching network 63. When terminals are added to the system, the same number of virtual channels must be provided in the ATM switching network 63. There is a limit of the number of virtual channels provided in the ATM switching network 63. For this reason, the number of terminals which can be coupled to the ATM switching network 63 is also limited. It should be noted that virtual channels are provided even for some terminals which are not often used. When terminals are added to or removed from the ATM switching network 63, the handler 62 must be modified so that the procedure for setting or releasing virtual channels are changed. Further, the handler 62 is required to have a large data processing ability to assemble and disassemble cells. Thus, the system employing the handler 62 is expensive.

The conventional system shown in FIG.2 has the disadvantages described below. As described previously, virtual channels are provided between terminals which may communicate with each other. When a large number of terminals may communicate, it is necessary to provide a large number of virtual channels in the ATM switching network 65. It will be noted that a limited number of virtual channels is provided in the ATM switching network 65. Thus, the number of terminals which can be accommodated in the ATM switching network 65 is also limited. When terminals are added to or removed from the ATM switching network 65, all virtual channels related to these terminals must be provided or removed.

SUMMARY OF THE INVENTION

It is a general object of the present invention to provide an improved system for controlling data transmission in the ATM switching system in which the aforementioned disadvantages are eliminated.

A more specific object of the present invention is to provide a system for controlling data transmission in the ATM switching system in which virtual channels are dynamically set so that data transmission between terminals is improved.

The above objects of the present invention are achieved by a transmission control system comprising:
   an asynchronous transfer mode (ATM) switching network;
   a plurality of terminals;
   a plurality of terminal adapters respectively connected to the plurality of terminals, each of the terminal adapters coupling a corresponding one of the terminals to the ATM switching network, data being transferred between the terminals through corresponding terminal adapters from among the terminal adapters and the ATM switching network;
   management table means for registering virtual channels presently formed in the ATM switching network in a management table. each of the virtual channels mutually connecting corresponding two of the terminal adapters through the ATM switching network;
   retrieval means for receiving a communication request from one of the terminals and for determining whether or not the management table registers a virtual channel corresponding to the communication request at present, data output from the one of the terminals being transferred to a different one of the terminals addressed by the communication request through the virtual channel corresponding to the communication request and corresponding two of the terminal adapters when the retrieval means determines that the management table has the virtual channel corresponding to the communication request; and virtual channel setting means for registering the virtual channel corresponding to the communication request in the management table when the retrieval means determines that the management table does not have the virtual channel corresponding to the communication request, data output from the one of the terminals being transferred to the different one of the terminals addressed by the communication request through the virtual channel registered in the management table by the virtual channel setting means. The management table means, retrieval means and virtual channel setting means can be provided in each of the terminal adapters or the ATM switching network.

BRIEF DESCRIPTION OF THE DRAWINGS

Other objects, features and advantages of the present invention will become apparent from the following detailed description when read in conjunction with the accompanying drawings, in which:

FIGS.5, 6, 7 and 8 are flowcharts illustrating the operation of the system shown in FIG.4;

DESCRIPTION OF THE PREFERRED EMBODIMENTS

Figure 1:
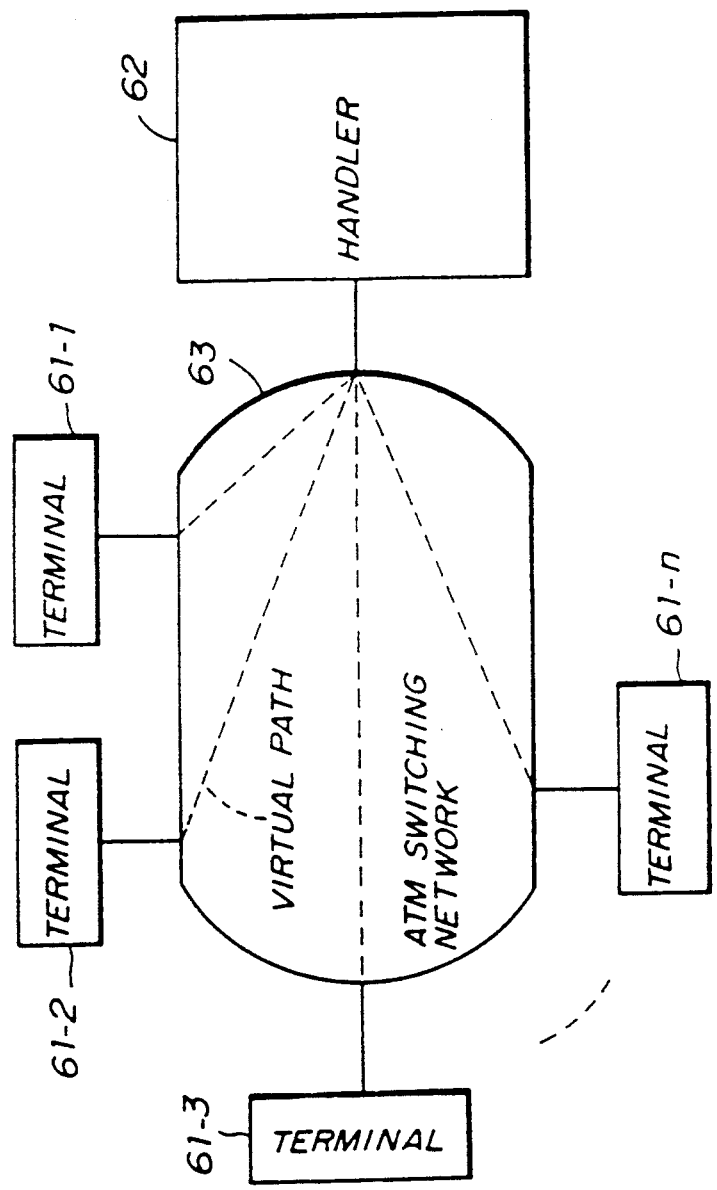
FIG.1 is a block diagram of a conventional system which employs a handler.
Figure 2:
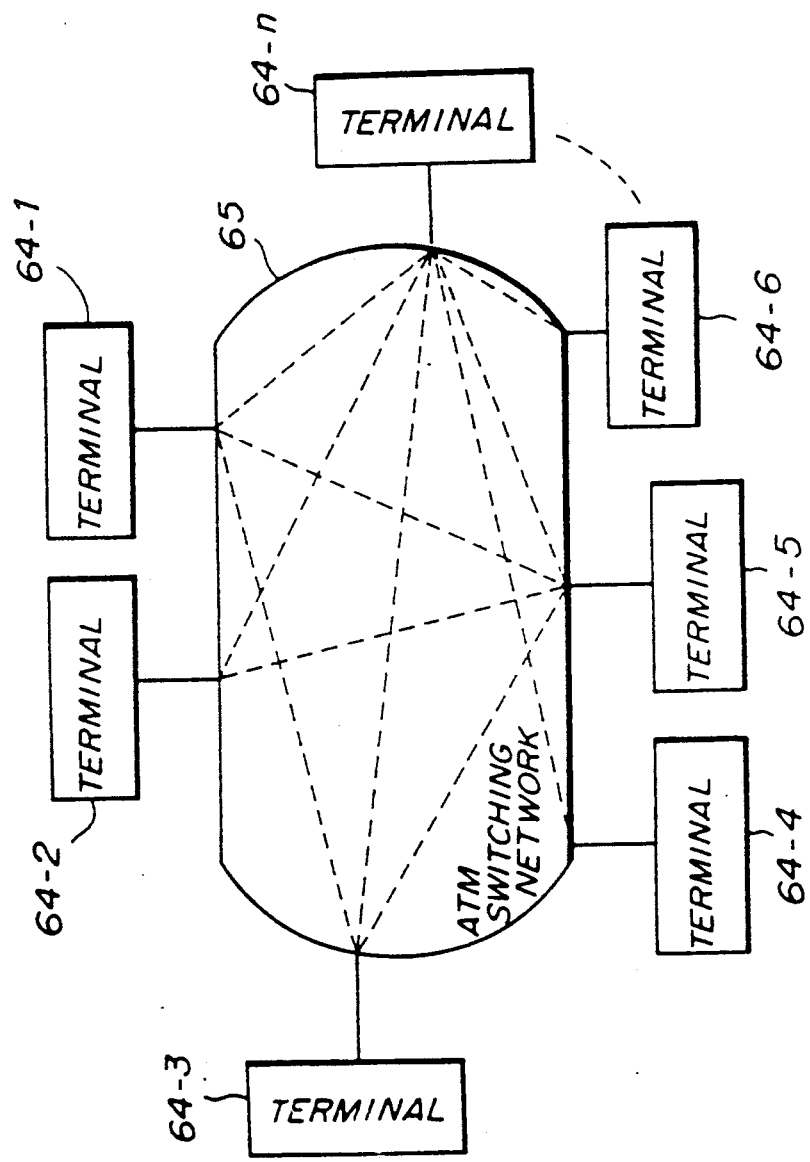
FIG.2 is a block diagram of another conventional system.
Figure 3:
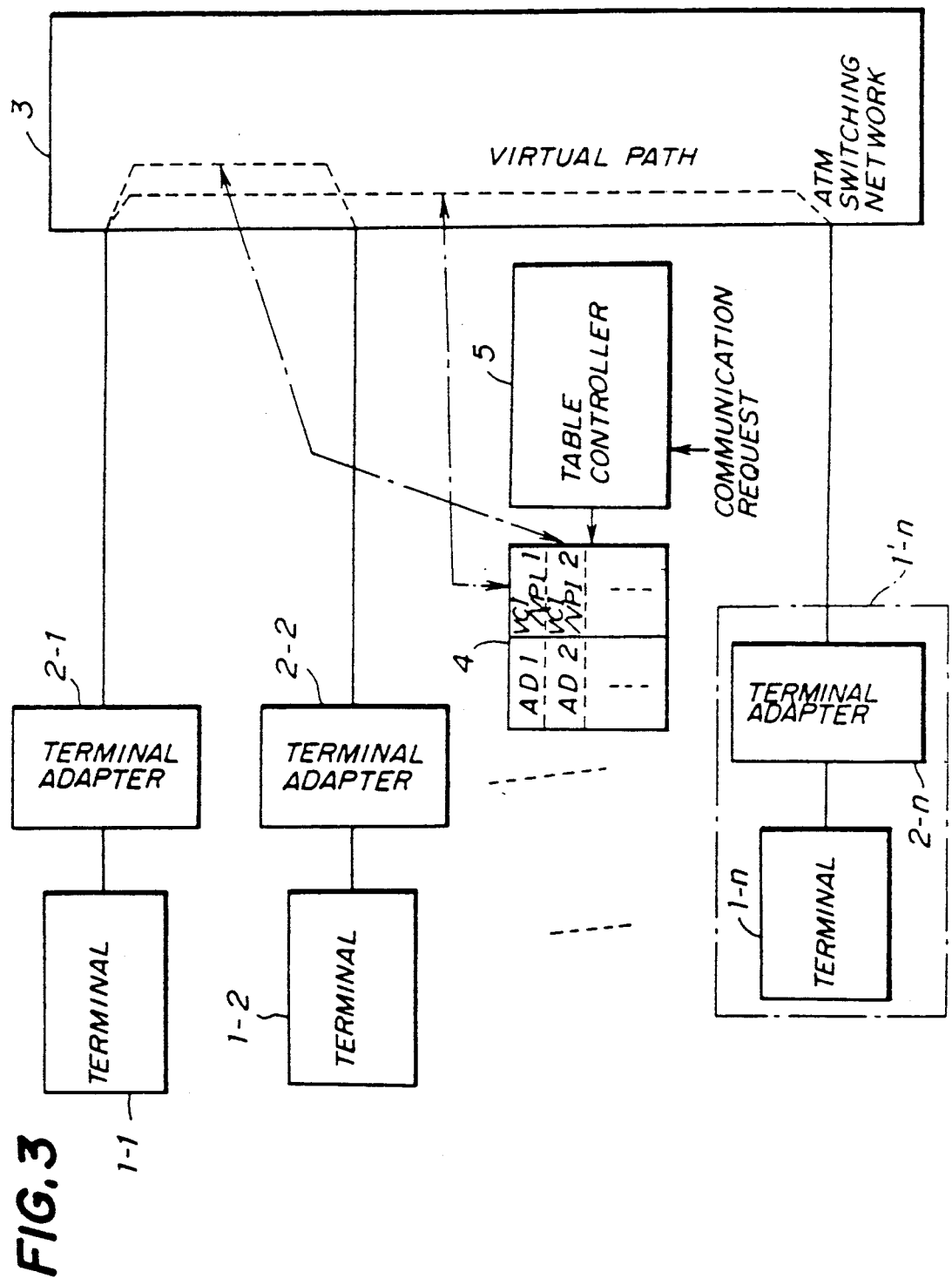
FIG.3 is a block diagram illustrating the principle of the present invention.

Referring to FIG.3, there is illustrated the principle of a system for controlling data transmission in an ATM switching network according to the present invention. A plurality of terminals 1-1 - 1-n are coupled to an ATM switching network 3 through terminal adapters 2-1 - 2-n, respectively. Data is transferred between the terminals 1-1 - 1-n through the ATM switching network 3 in an asynchronous transfer mode (ATM). A management table 4 which manages virtual channels formed in the ATM switching network 3 is coupled to the ATM switching network 3. A table controller 5 controls the management table 4. The table controller 5 determines whether or not virtual channels corresponding to communication requests from the terminals 1-1-1-n have been provided in the ATM switching network 3. When the table controller 5 determines that the ATM switching network 3 has a virtual channel corresponding to the communication request from a terminal, cells are transferred through this virtual channel. On the other hand, when the table controller 5 determines that the ATM switching network 3 does not have a virtual channel corresponding to the communication request, the table controller 5 defines the corresponding virtual channel in the management table 4. The terminal adapter 2 divides data output from the terminal which generates the communication request into cells, each having the header and sends the cells in the asynchronous transfer mode. Data output by each of the terminals 1-1-1-n is in conformity to, for example, the CCITT X.25 recommendation. The cells pass through the ATM switching network 3 and are sent to the destination terminal. When a predetermined condition is satisfied, the virtual channel is deleted from the management table 4. For example, when a predetermined time elapses from the time when the last cell is transferred, the corresponding virtual channel is deleted from the management table 4. It will be noted that if the terminal 1-n performs the function of the adapter 2-n, the terminal has the configuration surrounded by the one-dot chain line 1-n shown in FIG.3.

The management table 4 manages the relationship between the virtual channels (VCI/VPI1, VCI/VPI2, ...) and addresses (AD1, AD2, ...) of the terminals 1-1, 1-2, ... on the ATM switching network 13. The table controller 5 retrieves the management table 4, and sets or releases virtual channels. For example, the table controller 5 operates as follows. The table controller 5 determines whether or not the management table 4 has the called party address in response to the communication request. When the table controller 5 finds out the called party address in the management table 4, it recognizes that the related virtual channel directed to the other party terminal has been formed in the ATM switching network 3. When the table controller 5 does not find the called party address, it registers a virtual channel coupling two terminals being considered in the management table 4. Data output from the terminal which generates the communication request is divided into cells by the corresponding terminal adapter. Then, the cells are sent to the ATM switching network 3. As a result, it is possible to transfer data between terminals through the ATM switching network 3 by defining the corresponding virtual channel even if the ATM switching network 3 does not have the corresponding virtual channel at present.

When the predetermined condition is satisfied, virtual channels defined in the management table 4 are deleted therefrom. For example, virtual channels defined in the management table 4 may be deleted for every predetermined time. Alternatively, it is possible to delete each virtual channel from the management table 4 when a predetermined time elapses from the time when the corresponding virtual channel was last used. With the above-mentioned arrangement, it becomes possible to provide virtual channels dynamically and thus utilize the same effectively and efficiently.

Figure 4:
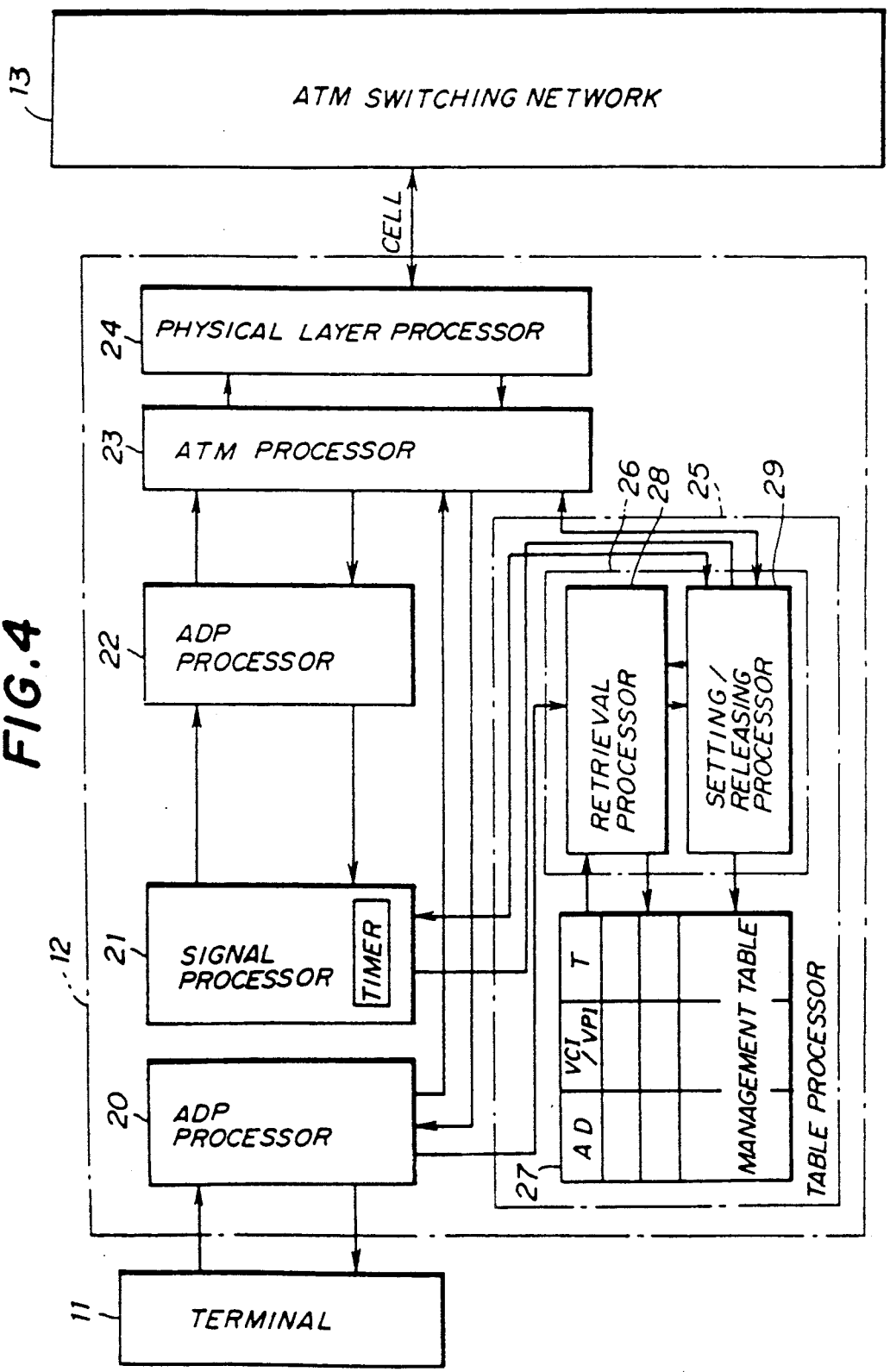
FIG.4 is a block diagram of a system according to a first preferred embodiment of the present invention.

A description will now be given of a first preferred embodiment of the present invention. Referring to FIG.4, there is illustrated a system according to the first preferred embodiment of the present invention. A terminal 11 is coupled to an ATM switching network 13 through a terminal adapter 12. The terminal adapter 12 is composed of an adaptation layer processor (hereinafter simply referred to as an ADP processor) 20, a signal processor 21, an ADP processor 22, an ATM processor 23, a physical layer processor 24 and a table processor 25. Each of the ADP processors 20 and 22 executes a conventional adaptation layer process. The ATM processor 23 assembles and disassembles cells. The physical layer processor 24 has the function of converting a receive signal level into a transmit signal level and vice versa. In a case where the ATM switching network 13 shown in FIG.4 is coupled to other ATM switching networks (not shown) through optical transmission channels, the physical layer processor 24 carries out a conversion between optical signals and electrical signals.

The table processor 25 is made up of a table controller 26 and a management table 27. The table controller 26 is composed of a retrieval processor 28 and a setting/releasing processor 29. The retrieval processor 28 accesses the management table 27 and determines whether or not the virtual channel corresponding to the communication request is defined in the management table 27. The setting/releasing processor 29 writes virtual channels into the management table 27 and eliminates the same therefrom. The management table 27 defines storage areas, each of which defines the party address AD, the virtual channel identification number VCI/VPI, and time T. The time T indicates when the virtual channel being considered was last used. Information about the time T is used for eliminating virtual channels from the management table 27. For example, when a predetermined time elapses from the time T, the corresponding virtual channel is deleted from the management table 27. Alternatively, it is possible to eliminate the virtual channel being considered when it is determined that the number of times that the present virtual channel is used is less than a predetermined number of times. As will be described later, it is possible to employ an additional condition, such as a release inhibit condition.

The terminal 11 sends the terminal adapter 12 data to which the called party address, that is, the called (destination) terminal is added. The ADP processor 20 receives the data and then transfers the called party address to the table processor 25. The table processor 25 controls the retrieval processor 28 so that it determines whether or not the virtual channel corresponding to the called party address is presently registered in the management table 27. When the retrieval processor 28 finds the called party address in the management table 27, the retrieval processor 28 sends the same to the ATM processor 23. Also, the ADP processor 20 divides the received data into cells, each having a header. The header includes information which indicates the position of the cell having this header in a series of cells. Each cell with the header added is transferred to the ATM processor 23, which writes the virtual channel identification number addressed to the destination terminal into the header. Then, each cell is sent to the ATM switching network 13 through the physical layer processor 24.

If the retrieval processor 28 determines that the virtual channel corresponding to the called party address is not registered in the management table 27, the retrieval processor 28 controls the setting/releasing processor 29 so that it sends a virtual channel setting request to the signal processor 21. The signal processor 21 determines a virtual channel identification number corresponding to the called party address, and informs the setting/releasing processor 29 of the determined virtual channel identification number. Alternatively, it is possible to generate the corresponding virtual channel by communicating with the ATM switching network 13 through the ATM processor 23 and the physical layer processor 24 in accordance with a call set-up procedure. This procedure will be described later.

The ATM switching network 13 sends information about the virtual channel setting request to the destination terminal. The setting/releasing processor 29 writes the virtual channel identification number VCI/VPI of the destination terminal into the management table 27. Then, the setting/releasing processor 29 informs the ATM processor 23 of the virtual channel identification number VCI/VPI. The ATM processor 23 writes the virtual channel identification number VCI/VPI into the header of each cell, which is then sent to the ATM switching network 13 through the ATM processor 23 and the physical layer processor 24.

In the case where the virtual channel setting request information is received from the ATM switching network 13, the signal processor 21 of the terminal adapter 12 which is located on the destination side in this case analyzes the virtual channel setting request information, and sends the party address AD and the virtual channel identification number VCI/VPI to the setting/releasing processor 29 of the table processor 25. By using the received information, the setting/releasing processor 29 registers the corresponding virtual channel in the management table 27.

Each virtual channel defined in the management table 27 is released, that is, deleted from the management table 27 as follows. A timer is provided in the signal processor 21 or the table processor 25. In the configuration shown in FIG.4, a timer is provided in the signal processor 21. Each time the timer indicates a predetermined time, the setting/releasing processor 29 releases virtual channels in the management table 27 unconditionally. Alternatively, when the time passage between the time T and the present time is equal to or greater than a predetermined passage time, the setting/releasing processor 29 releases the corresponding virtual channel unconditionally. Alternatively, when the number of times that the virtual channel being considered has been used is equal to or greater than a predetermined number of times, the setting/releasing processor 29 releases it. Alternatively, when the setting/releasing processor 29 determines that an available storage capacity of the management table 27 becomes less than a predetermined capacity which corresponds to, for example, one virtual channel, at least one virtual channel is released unconditionally or at least one virtual channel which is not frequently used is released. Alternatively, when a large number of virtual channels have already been realized in the ATM switching network 13 so that it becomes impossible to provide a new virtual channel, at least one virtual channel is released unconditionally or at least one virtual channel which is not frequently used is released.

It is possible to use a flag which inhibits the virtual channel from being released so that a virtual channel having a high degree of importance can be prevented from being deleted from the management table 27. Thereby, it is possible to dynamically register virtual channels in the management 27 and thus utilize them effectively and efficiently. The flag can be provided in the management table 27, for example.

Figure 5:
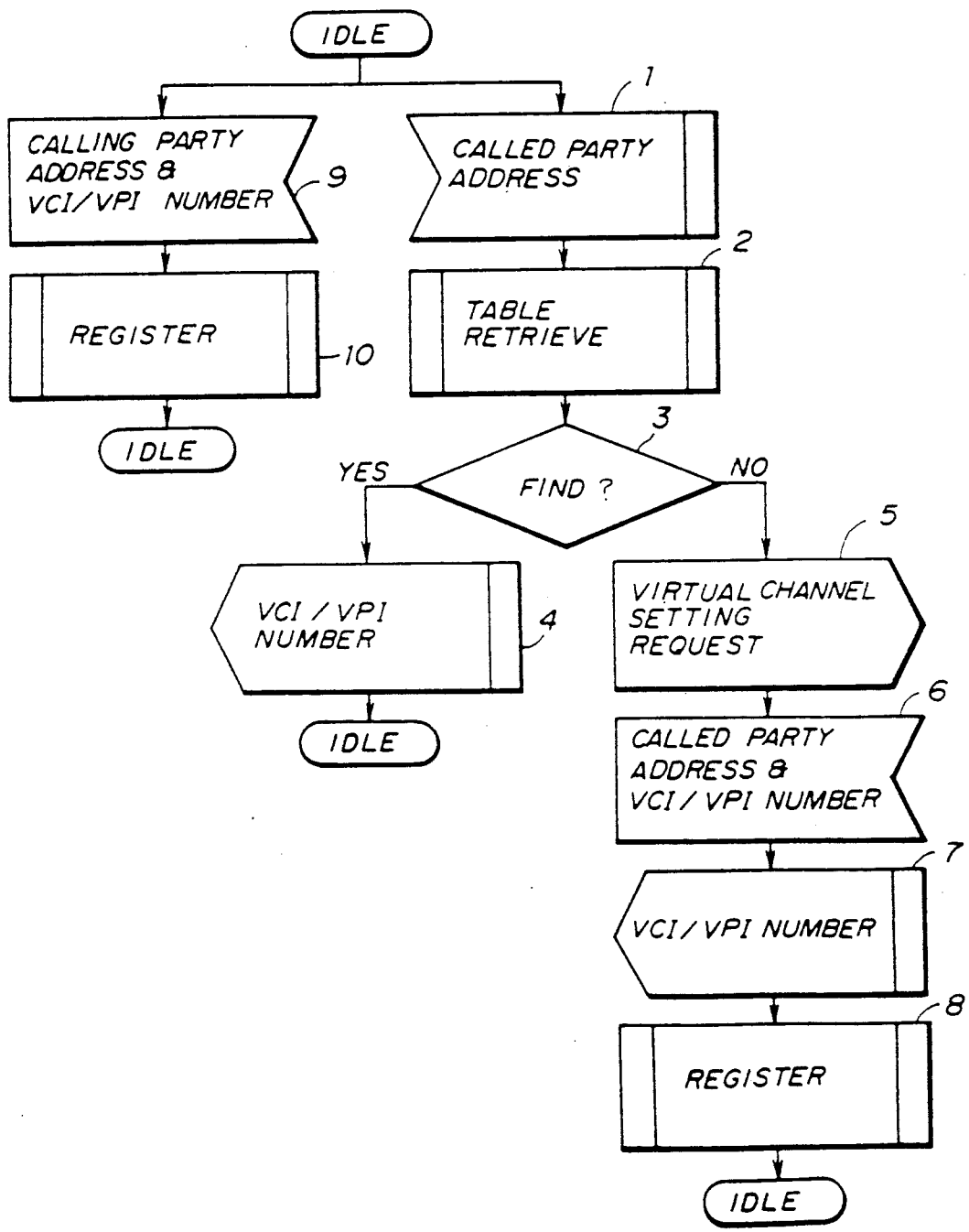

FIG.5 is a flowchart of a process performed by the table processor 25 shown in FIG.4. In FIG.5, "IDLE" denotes a process waiting state of the table processor 25.

The called party address is output to the retrieval processor 28 from the ADP processor 20 (step 1), and the retrieval processor 28 starts to retrieve the management table 27 (step 2). The retrieval processor 28 determines whether or not the virtual channel corresponding to the called party address is presently registered in the management table 27 (step 3). When the result obtained at step 3 is YES, the retrieval processor 28 informs the ATM processor 23 of the virtual channel identification number VCI/VPI of the other party terminal (step 4).

On the other hand, when the management table 27 does not define the corresponding virtual channel at present, the retrieval processor 28 instructs the setting-/releasing processor 29 to send the virtual channel setting request to the signal processor 21 (step 5). The signal processor 21 generates the virtual channel corresponding to the called party address by its internal process or transferring related information between itself the ATM network 13. Then, the signal processor 21 informs the setting/releasing processor 29 of the table processor 25 of the fact that the virtual channel has been set. This procedure is carried out by sending the called party address and the virtual channel identification number VCI/VPI to the setting/releasing processor 29 (step 6). Then, the setting/releasing processor 29 informs the ATM processor 23 of the informed virtual channel identification number VCI/VPI (step 7). After that, the setting/releasing processor 29 writes the virtual channel defined by the signal processor 21 into the management table 27 (step 8).

In the case where the system shown in FIG.4 receives the virtual channel setting request from the source terminal, it is sent to the signal processor 21 through the physical layer processor 24, the ATM processor 23 and the ADP processor 22. The signal processor 21 analyzes the received virtual channel setting request and generates, from the analyzed results, the calling party address and the virtual channel identification number VCI/VPI of the virtual channel connected to the source terminal. Then, the signal processor 21 informs the setting/releasing processor 29 of the calling party address and the virtual channel identification number VCI/VPI (step 9). Then, the setting/releasing processor 29 registers the corresponding virtual channel in the management table 27 (step 10).

Figure 6:
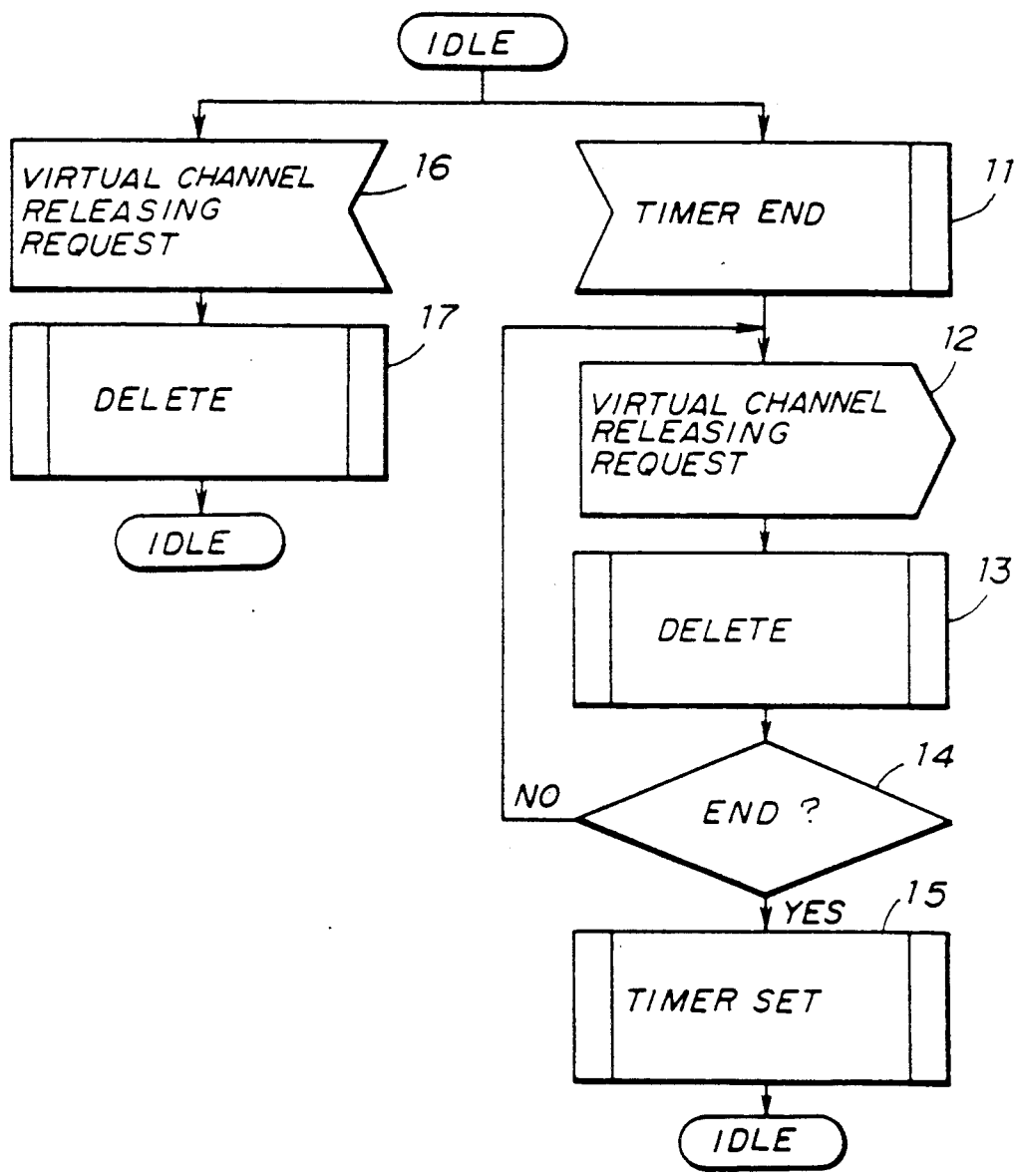

FIG.6 is a flowchart of the procedure for unconditionally releasing virtual channels. The procedure shown in FIG.6 is executed by the table processor 25. As has been described previously, the timer for measuring the predetermined time is provided in the table processor 25 or the signal processor 21. When the timer indicates the predetermined time, it lets the setting-/releasing processor 29 of this fact (step 11). The setting/releasing processor 29 generates a request to release the virtual channels defined in the management table 27 (step 12). Then, the setting/releasing processor 29 deletes the virtual channel being considered from the management table 27 (step 13). After that, the setting-/releasing processor 29 determines whether or not all the virtual channels defined in the management table 27 have been deleted (step 14). When the result at step 14 is NO, the procedure returns to step 12. On the other hand, when the result at step 14 is YES, the setting-/releasing processor 29 sets the timer so that it starts to measure the predetermined time (step 15).

On the other hand, the signal processor 21 analyzes the virtual channel releasing request and generates the calling/called party address and the virtual channel identification number VCI/VPI (step 16). Then, the signal processor 21 generates the request to release the corresponding virtual channel (step 16), and sends the same to the setting/releasing processor 29. In response to this request, the setting/releasing processor 29 deletes the specified virtual channel from the management table 27 (step 17).

FIGS.7 and 8 are flowcharts of the procedures for monitoring the passage time on the side of the ATM switching network 13 and releasing virtual channels on the basis of the monitored passage of time. The procedure shown in FIG.7 is related to the terminal adapter 12, and the procedure shown in FIG.8 is related to the ATM switching network 13. The ATM switching network 13 is provided with a table which defines the virtual channel identification number VCI/VPI and time T, and a timer for measuring a predetermined time. When the timer built in the ATM switching network 13 indicates the predetermined time, the ATM switching network 13 determines whether or not the passage time between the time when the virtual channel being considered was last used and the present time exceeds a predetermined threshold time. This determination procedure is carried out for each of the virtual channels defined in the management table provided in the ATM switching network 13. When the determination result is YES, the request to delete the corresponding virtual channel from the management table provided in the ATM switching network 13 is generated (step 21). Then, the virtual channel defined by the virtual identification number VCI/VPI and time T are deleted from the management table in the ATM switching network 13 (step 22). Then, it is determined that all the virtual channels defined in the management table in the ATM switching network 13 have been processed (step 23). When the result at step 23 is NO, the procedure returns to step 21. On the other hand, when the result at step 23 is YES, the timer built in the ATM switching network 13 is started to measure the predetermined time (step 24).

On the other hand, the setting/releasing processor 29 is informed in step 18 of the request which is generated at step 21. Then, the setting/releasing processor 29 deletes the corresponding virtual channel from the management table 27 (step 19). As described above, the procedures shown in FIGS.7 and FIG.8 are related to the arrangement in which the ATM switching network 13 monitors the predetermined time by the timer provided therein and it is determined whether or not the passage of time from the time when the virtual channel of interest was last used exceeds the predetermined threshold time. Alternatively, it is possible to utilize the number of times that each virtual channel defined in the management table in the ATM switching network 13 was used in the past. In this case, it is determined whether or not the number of times that the virtual channel being considered exceeds a predetermined number of times.

Figure 9:
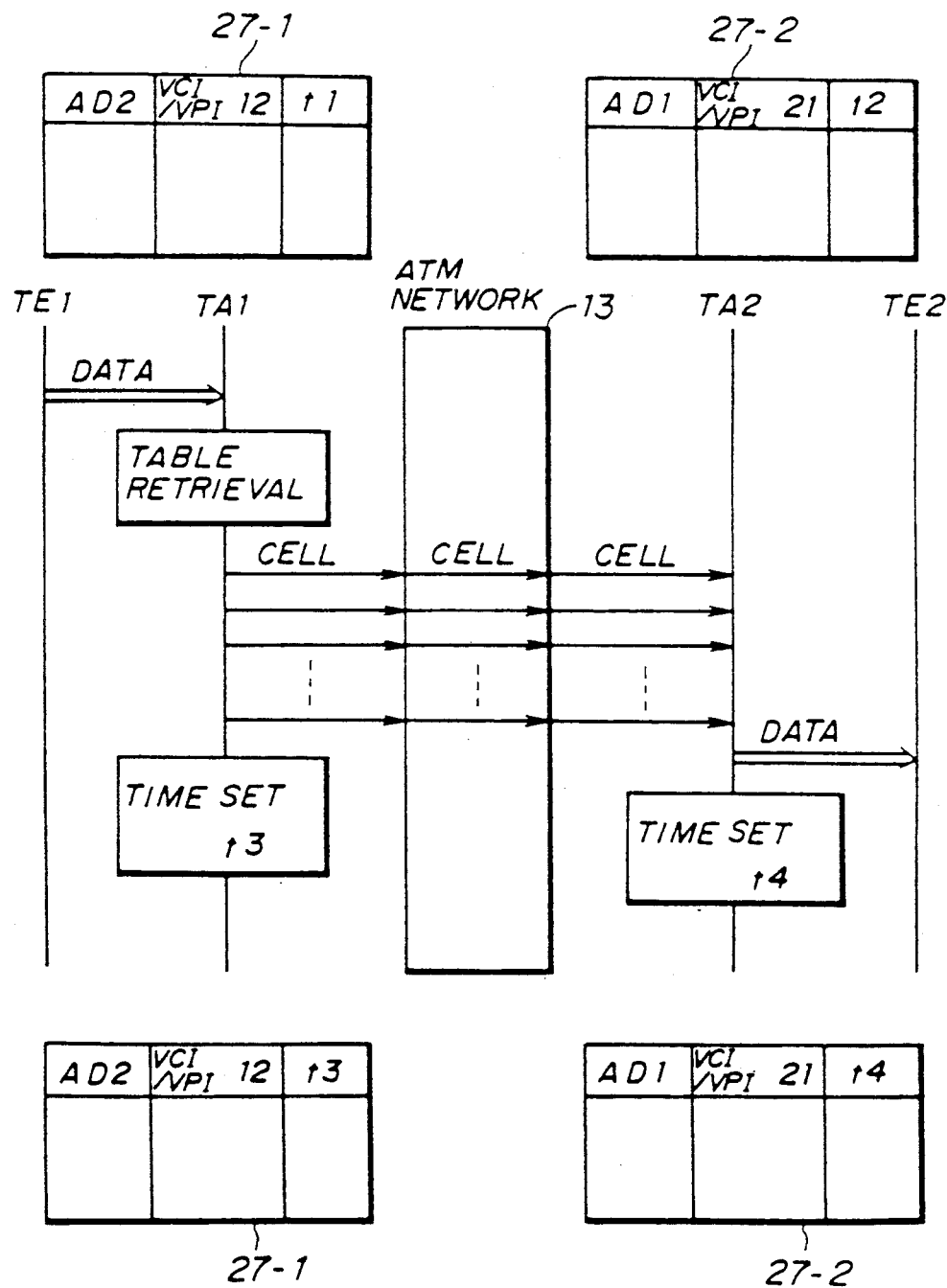
FIGS.9, 10 and 11 are block diagrams, each illustrating the operation of the system shown in FIG.4.
Figure 10:
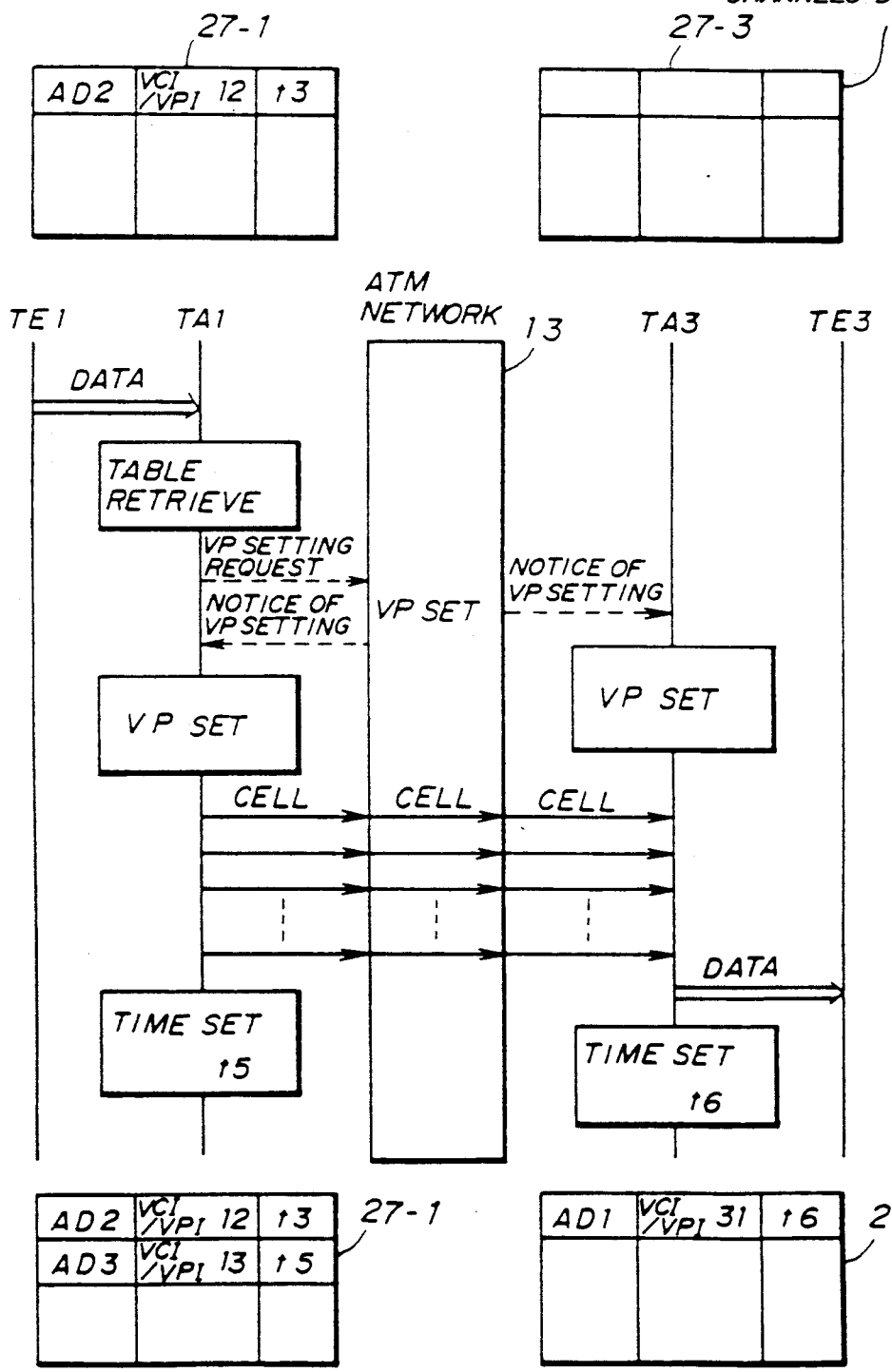
Figure 11:
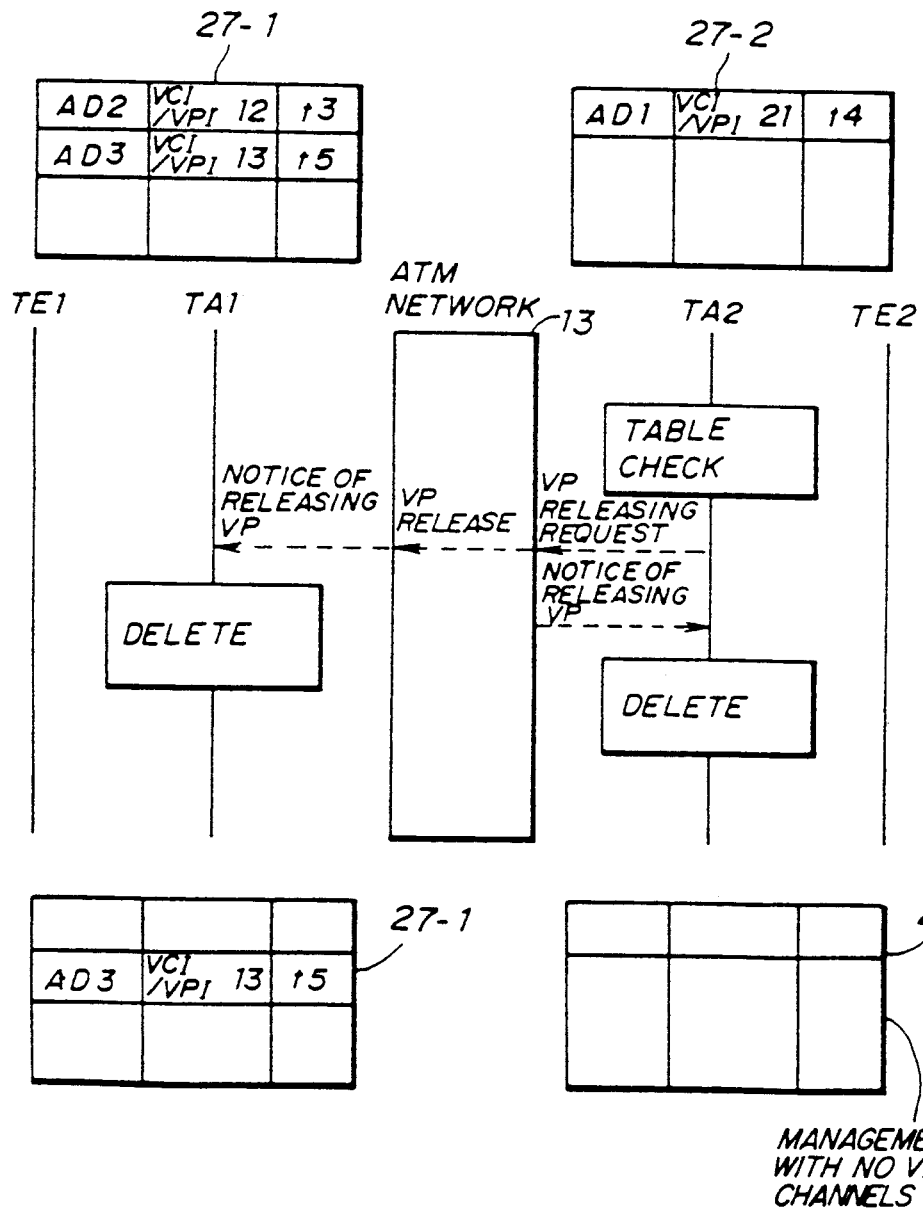

FIGS.9 through 11 are diagrams illustrating the operation of the system shown in FIG.4. Referring to FIG.9, terminals TE1 and TE2 are coupled to the ATM switching network 13 through terminal adapters TA1 and TA2, respectively. In the illustrated case, address AD2 of another party terminal, virtual channel identification number VCI/VPI12 and last used time t1 are registered in a management table 27-1 of the terminal adapter TA1. Also, address AD1 of another party terminal, virtual channel identification number VCI/V-

PI21 and last used time t2 are registered in a management table 27-2 of the terminal adapter TA2.

It is now assumed that data is sent from the terminal TE1 to the terminal TE2. The terminal adapter TA1 retrieves the management table 27-1 and determines whether or not the virtual channel addressed to the terminal TE2 is presently defined in the management table 27-1. In the case illustrated in FIG.9, the address of the terminal TE2 and the virtual channel identification number AD2 are defined in the management table 27-1. Thus, the terminal adapter TA1 divides data to be transmitted into cells, each having the header containing the virtual channel identification number VCI/VPI12. Then, the terminal adapter TA1 sends the cells to the ATM switching network. Time t3 when all the cells have just been sent to the ATM switching network 13 is written into the management table 27-1 of the terminal adapter TA1.

The terminal adapter TA2 receives the cells from the ATM switching network 13 and assembles the received cells into the original data. The assembled data is sent to the terminal TE2. Time t4 when the data has just been sent to the terminal TE2 is written into the management table 27-2 of the terminal adapter TA2.

FIG.10 illustrates a case where data is sent from the terminal TE1 to a terminal TE3. The terminal adapter TA1 retrieves the management table 27-1 in the way as described previously. In this case, the ATM switching network 13 does not have any virtual channel which mutually connects the terminal adapters TA1 and TA3. Thus, each of the management tables 27-1 and 27-3 does not have any information about the virtual channel which connects the terminal adapters TA1 and TA3, that is, the address of the other party terminal and the virtual channel identification number VCI/VPI. Thus, the terminal adapter TA1 requests the ATM network 13 to set the corresponding virtual channel (VP).

The ATM switching network 13 selects an idle virtual channel and informs each of the terminal adapters TA1 and TA3 of the selected virtual channel. The selected virtual channel identified by VCI/VPI13 or VCI/VPI31 is defined in the management tables 27-1 and 27-3, respectively. The terminal adapter TA1 divides data to be transmitted into cells, each having the header including the virtual channel identification number VCI/VPI13. Then, the cells are sent to the ATM switching network 13 from the terminal adapter TA1. Time t5 when all the cells have just been output to the ATM switching network 13 is written into the management table 27-1 of the terminal adapter TA1. The terminal adapter TA3 receives the cells from the ATM switching network 13 and assembles the same into the original data. Then, the terminal adapter TA3 sends the original data to the terminal TE3. Time t6, when the original data has just been output to the terminal TE3, is written into the management table 27-3 of the terminal adapter TA3. By the above-mentioned procedure, the address AD3 of the terminal TE3, the virtual channel identification number VCI/VPI13 and the last used time t5 are defined in the management table 27-1. Similarly, the address AD1 of the terminal TE1, the virtual channel identification number VCI/VPI31 and the last used time t6 are defined in the management table 27-3.

FIG.11 illustrates a case where the management table 27-2 of the terminal adapter TA2 is referred to and the virtual channel releasing request is generated due to the fact that the passage time from the last used time when the virtual channel VP addressed to the terminal TE1 was last used exceeds the predetermined threshold time. The terminal adapter TA2 sends the virtual channel releasing request to the ATM switching network 13. In response to this request, the ATM switching network 13 informs each of the terminal adapters TA1 and TA2 of the occurrence of the virtual channel releasing request. Thereby, the address AD2 of the terminal TE2, the virtual channel identification number VCI/VPI12 and time t3 are deleted from the management table 27-1. Similarly, the address AD1 of the terminal TE1, the virtual channel identification number VCI/VPI21 and time t4 are deleted from the management table 27-2.

Figure 12:
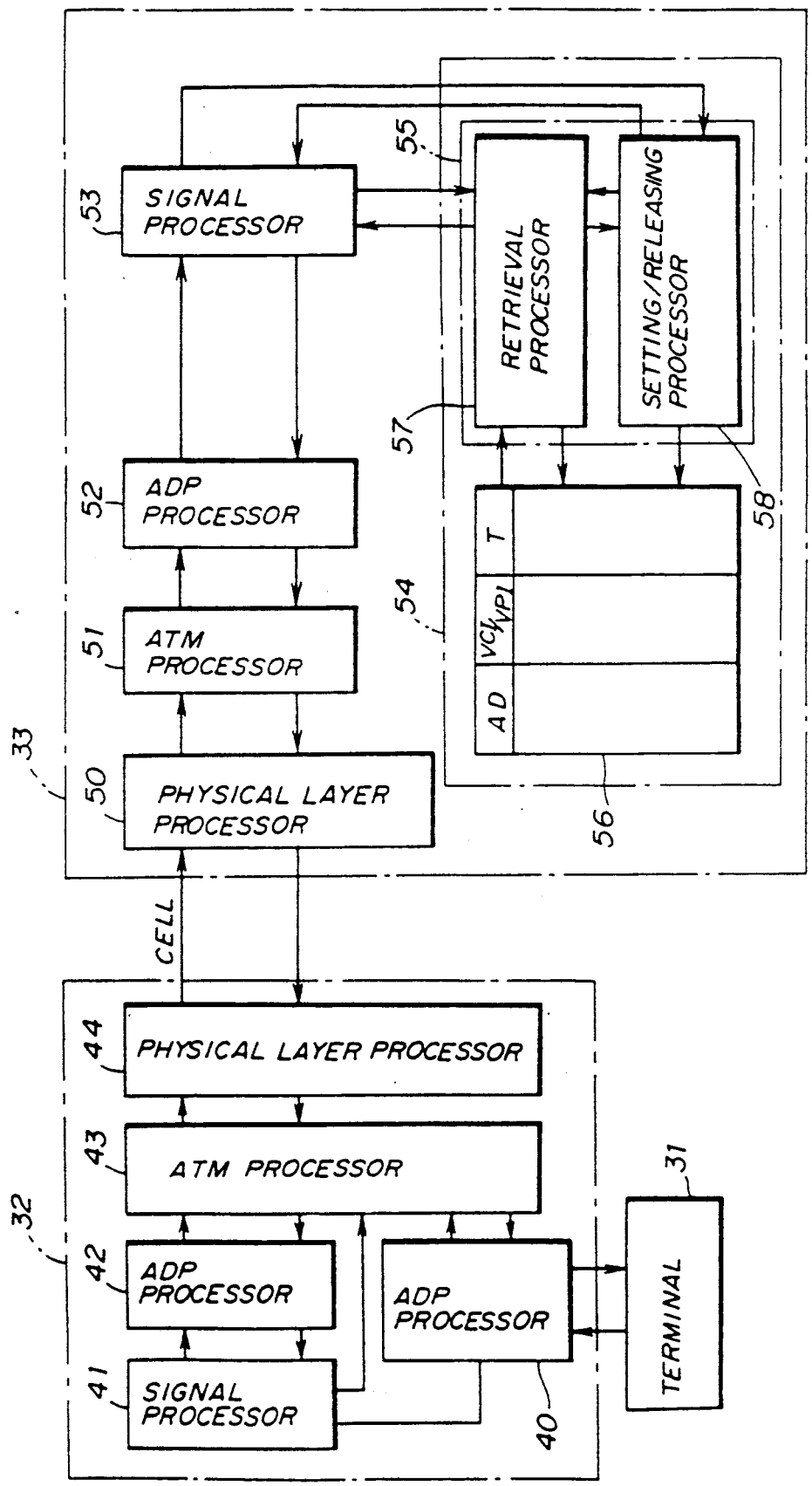
FIG.12 is a block diagram of a system according to a second preferred embodiment of the present invention.

A description will now be given of a second preferred embodiment of the present invention with reference to FIG.12. It will be noted that a management table as provided in each of the aforementioned terminal adapters is provided in the ATM switching network and that each terminal adapter does not have any management table. Referring to FIG.12, the system is composed of a terminal 31, a terminal adapter 32 and an ATM switching network 33. It will be noted that the configuration of the ATM switching network 33 corresponds to a network controller provided at an arbitrary position thereof. The terminal adapter 32 is of the same structure as the terminal adapter 12 (FIG. 4) except that the terminal adapter 32 does not have any management table. That is, the terminal adapter 32 is composed of an ADP processor 40, a signal processor 41, an ADP processor 42, an ATM processor 43 and a physical layer processor 44.

The ATM switching network 33 includes a physical layer processor 50, an ATM processor 51, an ADP processor 52, a signal processor 53 and a table processor 54. The table processor 54 is made up of a table controller 55 and a management table 56. The table controller 55 is comprised of a retrieval processor 57 and a setting/releasing processor 58. The above-mentioned elements of the ATM switching network 33 operate the same as corresponding elements shown in FIG.4. The management table 56 is provided for each of the terminals 31 (only one management table 56 is shown in FIG.12).

Figure 13:
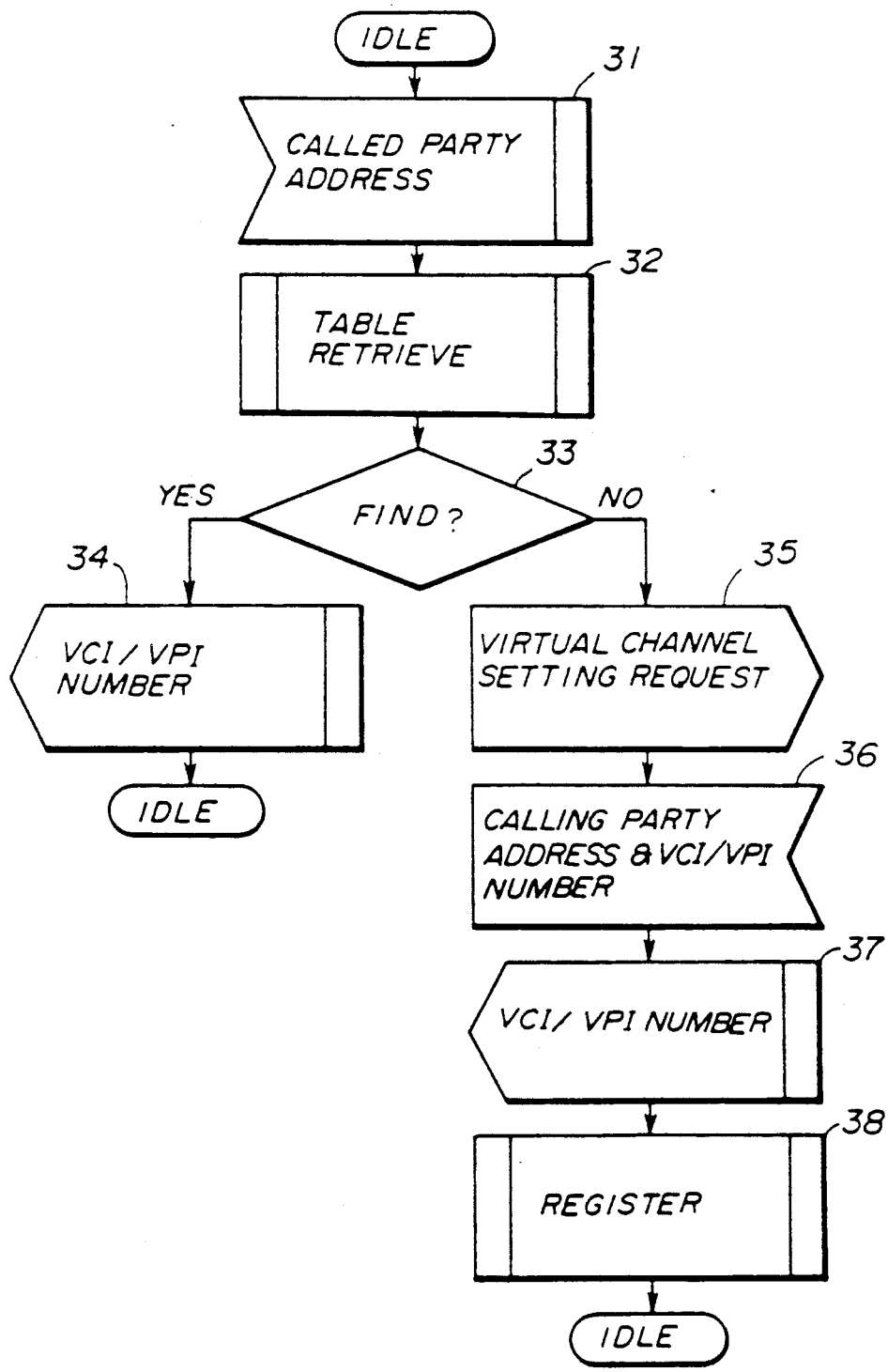
FIGS.13, 14 and 15 are flowcharts illustrating the operation of the system shown in FIG.12.

FIG.13 is a flowchart of the operation of the table processor 54 shown in FIG.12. The retrieval processor 57 receives the called party address from the signal processor 53 of the ATM switching network 33 (step 31). Then, the retrieval processor 57 retrieves the management table 56 (step 33), and determines whether or not a virtual channel corresponding to the received called party address is presently defined in the management table 56 (step 33). When the result obtained at step 33 is YES, the retrieval processor 57 informs the signal processor 53 of the virtual channel identification number VCI/VPI of the defined virtual channel (step 34). On the other hand, when it is determined that no virtual channel related to the received called party address is presently defined in the management table 56 (step 33), the retrieval processor 57 instructs the setting/releasing processor 58 to request the signal processor 53 to generate a request to set the virtual channel corresponding to the called party address (step 35). Then, the signal processor 53 selects an idle virtual channel and informs the setting/releasing processor 58 of the calling party address and the virtual channel identification number VCI/VPI (step 36). The virtual channel identification number VCI/VPI thus obtained is sent to the ATM processor 51 (step 37). Then, the setting/releasing processor 58 registers the selected virtual channel in the management table 56 (step 38).

As described above, a virtual channel is set in response to the communication request addressed to a terminal which is not defined in the management table 56 so that cells can be transmitted through this virtual channel.

Figure 14:
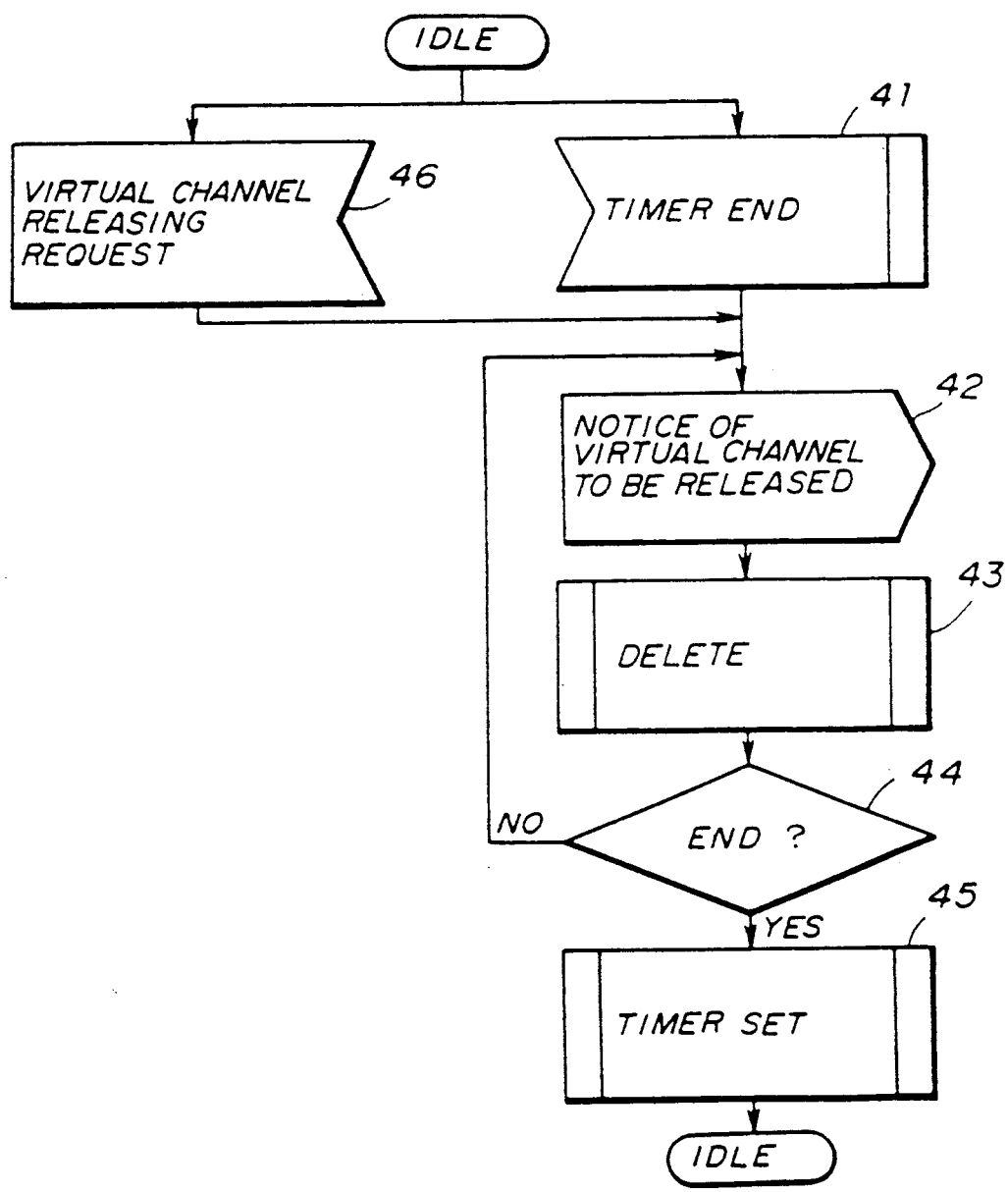

FIG.14 is a flowchart of the procedure for unconditionally releasing virtual channels. When the timer indicates the predetermined time (step 41) or when the virtual channel releasing request is generated (step 46), the setting/releasing processor 58 is notified of the virtual channel to be released (step 42), and deletes the same from the management table 56 (step 43). When all the virtual channels defined in the management table 56 have been checked (step 44), the setting/releasing processor 58 starts the timer to measure the predetermined time (step 45).

Figure 15:
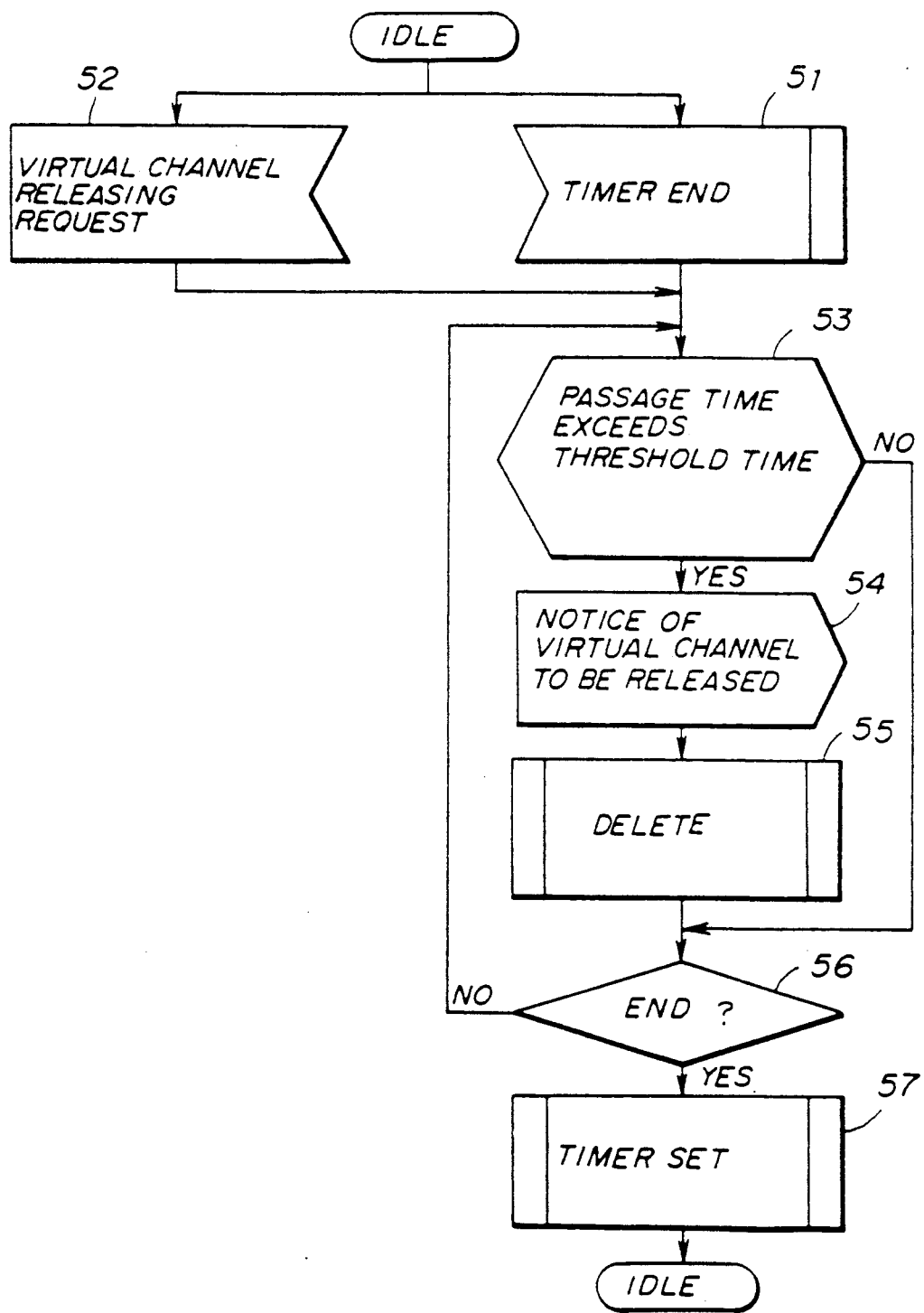

FIG.15 is a flowchart of the procedure for conditionally releasing virtual channels. When the timer indicates the predetermined time (step 51) or when the virtual channel releasing request is generated (step 52), the setting/releasing processor 58 determines whether or not the passage of time from the time when the virtual channel being considered was last used exceeds the predetermined threshold time (step 53). When the result obtained at step 53 is YES, the setting/releasing processor 58 deletes the virtual channel being considered from the management table 56 (steps 54 and 55). Then it is determined, at step 56, whether or not all the virtual channels defined in the management table 56 have been checked. The procedure at step 56 is also executed when the result obtained at step 53 is NO. When the result at step 56 is NO, the procedure returns to step 53. On the other hand, when the result at step 56 is YES, the setting/releasing processor 58 sets the timer so that it starts to measure the predetermined time (step 57).

Figure 16:
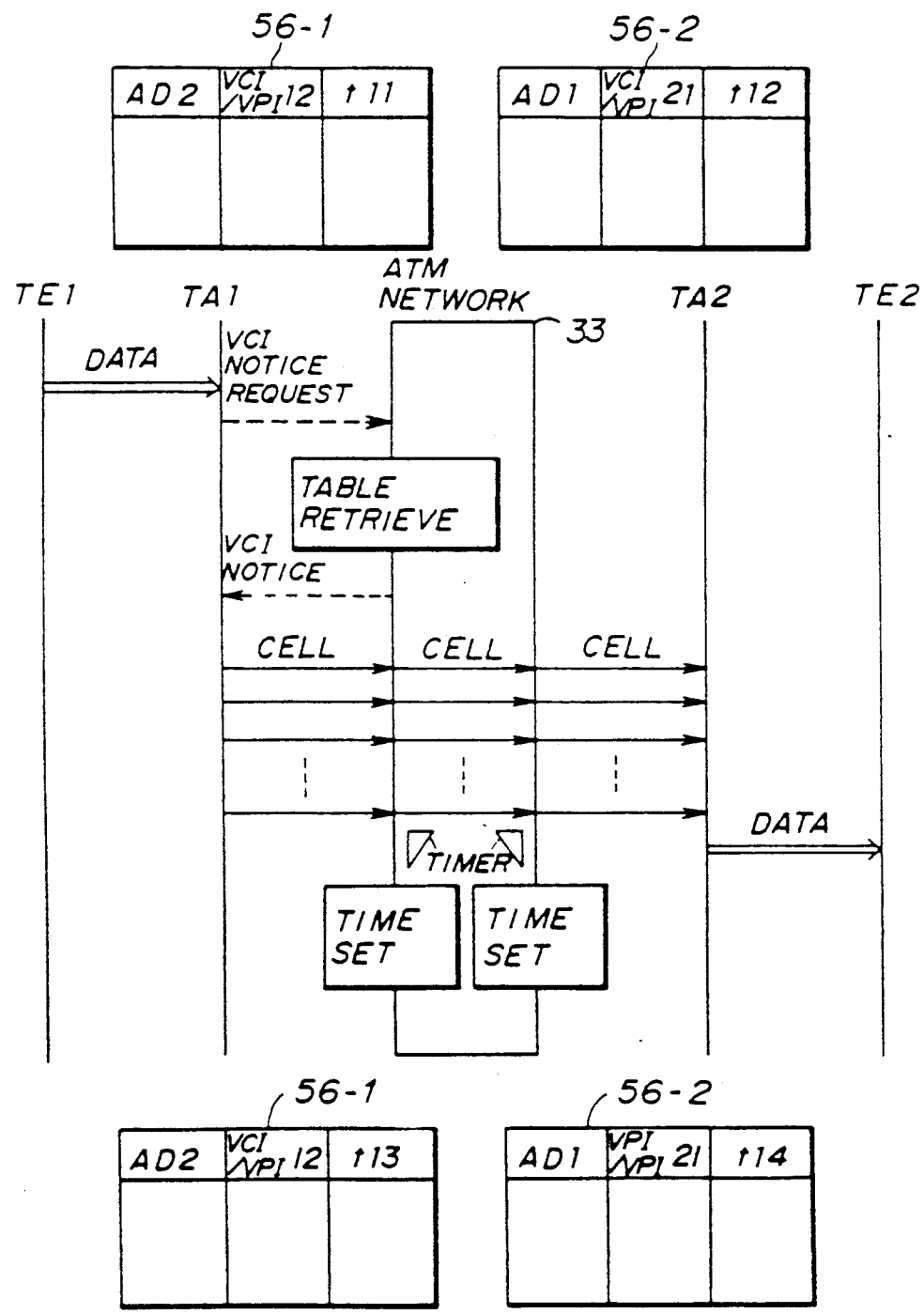
FIGS.16, 17 and 18 are block diagrams, each illustrating the operation of the system shown in FIG.12.

A description will now be given of the operation of the system according to the second preferred embodiment of the present invention. Referring to FIG.16, the address AD2 of the terminal TE2, the virtual channel identification number VCI/VPI12 and time t11 when the virtual channel identification number VCI/VPI12 was last used are defined in a management table 56-1 provided for the terminal TE1. The address AD1 of the terminal TE1, the virtual channel identification number VCI/VPI21 and time t12 when the virtual channel identification number VCI/VPI21 was last used are defined in a management table 56-2 provided for the terminal TE2.

Data is output to the terminal adapter TA1 from the terminal TE1. The terminal adapter TA1 sends a virtual channel identification number notice request to the ATM switching network 33 by using a call set-up message defined by the CCITT recommendations or the like. The retrieval processor 57 of the ATM switching network 33 determines whether or not the requested virtual channel identification number is registered in the management table 56 at present. In the illustrated case, the virtual channel identification number VCI/VPI12 is registered in the management table related to the terminal TE1. Thus, the setting/releasing processor 58 informs the terminal TE1 of the virtual channel identification number VCI/VPI12 through the signal processor 53, the ADP processor 52, the ATM processor 51 and the physical layer processor 50. In response to the notice of the virtual channel identification number VCI/VPI12, the terminal adapter TA1 divides data into cells and writes the virtual channel identification number VCI/VPI12 into the header of each of the cells. Then, the terminal adapter TA1 sends the cells to the ATM switching network 33.

The ATM switching network 33 sends the received cells to the terminal adapter TA2, which assembles the received cells into the original data. Then, the terminal adapter TA2 sends the original data to the terminal TE2. The timers provided in the ATM switching network 33 for the terminals TE1 and TE2 start to measure the predetermined time when the last cell is processed. Time t13 when the last cell was received is written into the management table 56-1, and time t14 when the last cell was output is written into the management cell 56-2.

Figure 17:
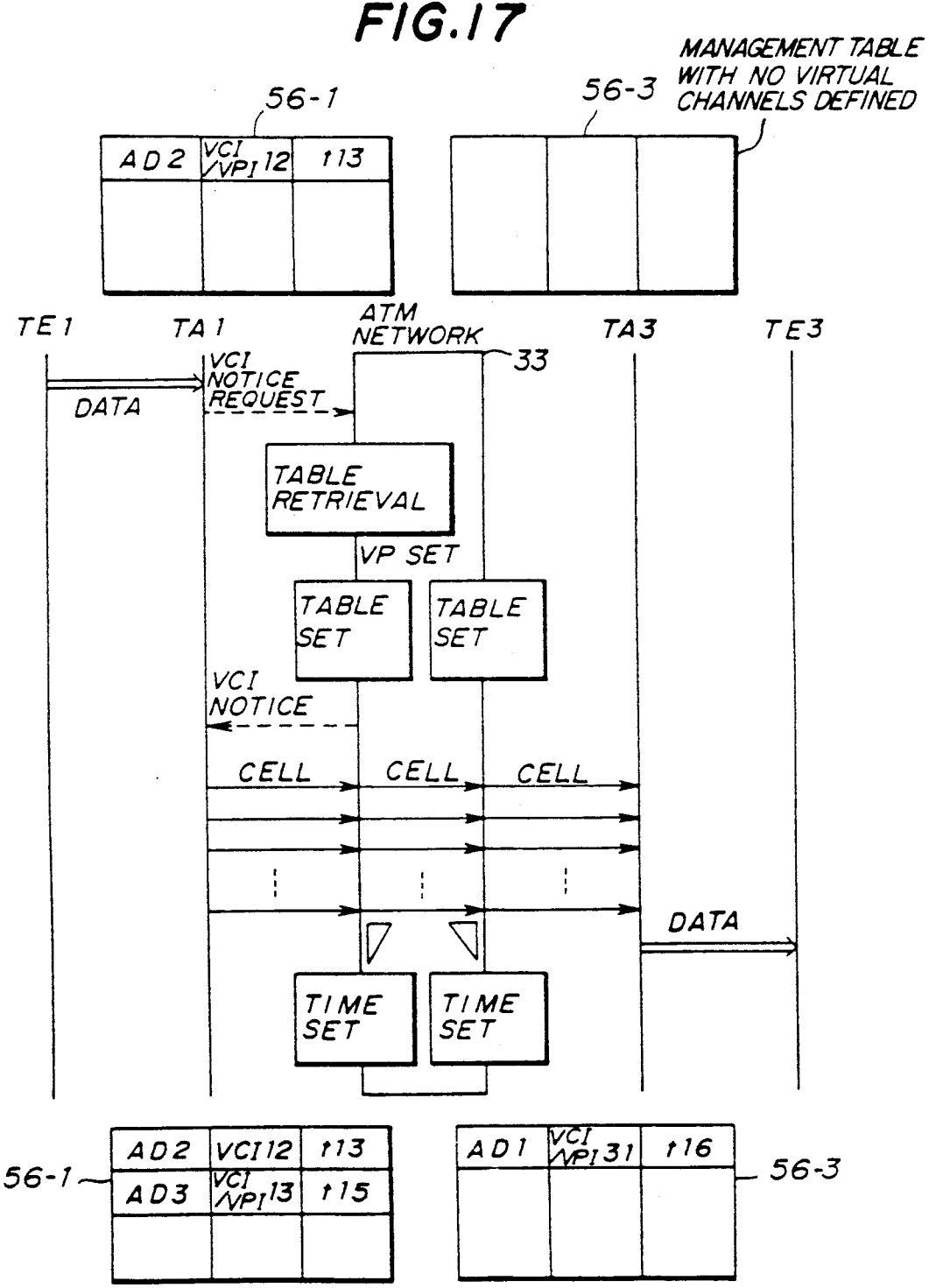

FIG.17 is a diagram illustrating a case where there is no virtual channel between the terminal adapters TA1 and TA3. No information is presently defined in a management table 56-3 which is provided in the ATM switching network 33 and related to the terminal TE3. It is now assumed that data is transferred from the terminal TE1 to the terminal TE3. The terminal adapter TA1 sends the virtual call identification number notice request to the ATM switching network 33 in the same manner as described before. The retrieval processor 57 of the ATM switching network 33 retrieves the management table 56-1 related to the terminal TE1 and determines whether or not the virtual channel addressed to the terminal TE3 is defined in the management table 56-1. In the illustrated case, no virtual channel is defined in the management table 56-1. The setting/releasing processor 58 registers address AD3 of the terminal TE3 and the virtual channel identification number VCI/VPI13 in the management table 56-1. Similarly, the setting/releasing processor 58 registers address AD1 and the virtual channel identification number VCI/VPI31 in the management table 56-3. Then, the ATM switching network 33 informs the terminal adapter TA1 of the virtual channel identification number VCI/VPI13.

The terminal adapter TA1 divides data into cells, each having the header containing the virtual channel identification number VCI/VPI13. Then, the terminal adapter TA1 sends the cells to the ATM switching network 33 and then the terminal adapter TA3. The terminal adapter TA3 assembles the cells into the original data, which is then sent to the terminal TE3. Time t15 when the ATM switching network receives the last cell is written into the management table 56-1 under the control of the setting/releasing processor 58. Similarly, time t16 when the ATM switching network outputs the last cell is written into the management table 56-3. Then, the timers provided for the terminals TE1 and TE2 are started to measure the predetermined time.

Figure 18:
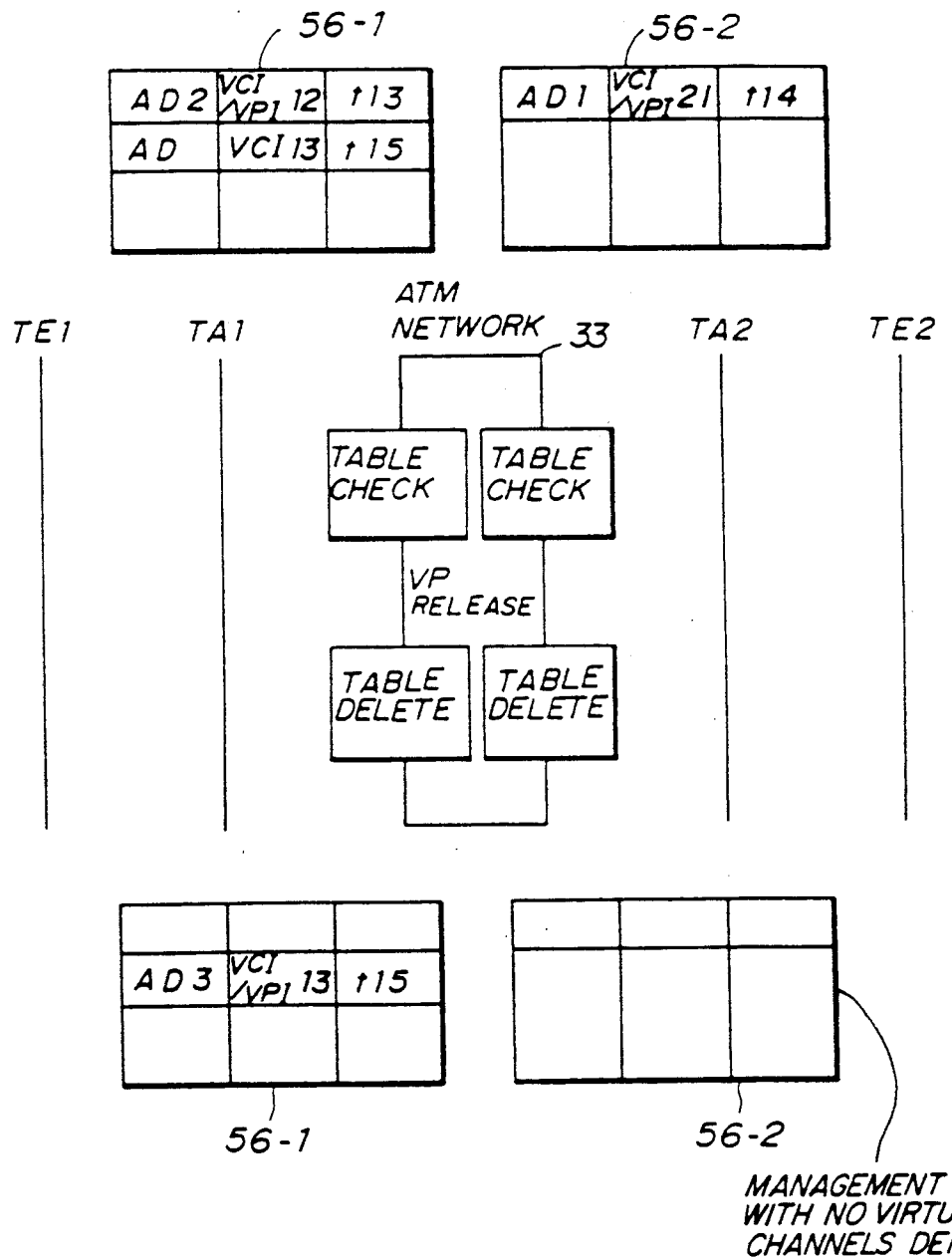

FIG.18 is a diagram illustrating the procedure for releasing virtual channels. It is now assumed that the management tables 56-1 and 56-2 have the contents shown in FIG.18. The setting/releasing processor 58 accesses each of the management tables 56-1 and 56-2 and extracts virtual channels for which the passage of time from the last used time to the present time exceeds the predetermined threshold time. Then, the setting/releasing processor 58 deletes these virtual channels from the corresponding management tables 56-1 and 56-2. For example, if both the passage of time between the time t13 and the present time and the passage of time between time t14 and the present time exceed the predetermined threshold time, the corresponding virtual channels are deleted so that the contents of the management tables 56-1 and 56-2 are changed, as shown in FIG. 18. That is, the virtual channel between the terminals TE1 and TE2 is deleted.

The present invention is not limited to the specifically disclosed embodiments, and variations and modifications may be made without departing from the scope of the present invention. For example, when the number of virtual channels in each of the management tables becomes equal to or greater than a predetermined number of virtual channels, a virtual channel which has not yet been used for a period of time longer than a predetermined period of time from the last used time is set to be a candidate to be deleted. Alternatively, a virtual channel which is not often used is set to be a candidate to be deleted.

According to the aforementioned first embodiment of the present invention, virtual channels realized in the ATM switching network are managed on the terminal side. Thus, it is possible to reduce a load on the ATM switching system. According to the aforementioned second embodiment of the present invention, virtual channels are managed on the ATM switching network side so that they can easily be released from the management tables.

It will be noted that The ATM switching network 13 shown in FIG. 4 has the configuration of the ATM switching network 33 except the table processor 54. The aforementioned timer or counter used in the first embodiment of the present invention is provided in the signal processor 21 or the setting/releasing processor 29. Similarly, the timer or counter used in the second embodiment of the present invention is provided in the signal processor 53 or the setting/releasing processor 58. The table processor 25 or 54 can be formed of a central processing unit, a microprocessor or the like.

What is claimed is:

1. A transmission control system comprising:
   an asynchronous transfer mode (ATM) switching network providing virtual channels;
   a plurality of terminals;
   a plurality of terminal adapters connected to said ATM switching network and respectively connected to said plurality of terminals, each of said terminal adapters coupling a corresponding one of said terminals to said ATM switching network, data being transferred between any pair of said terminals through two corresponding terminal adapters from among said terminal adapters and said ATM switching network;
   management table means, including a management table, for registering the virtual channels presently formed in said ATM switching network in said management table, each of said virtual channels mutually connecting two corresponding terminal adapters through said ATM switching network;
   retrieval means for receiving a communication request from a first one of said terminals and for determining whether said management table registers a virtual channel corresponding to the communication request, data output from the first one of said terminals being transferred to a second one of said terminals addressed by the communication request through the virtual channel corresponding to the communication request and the two corresponding terminal adapters corresponding to the first and second ones of said terminals when said retrieval means determines that said management table has the virtual channel corresponding to the communication request;
   virtual channel setting means for registering the virtual channel corresponding to the communication request in said management table when said retrieval means determines that said management table does not have the virtual channel corresponding to the communication request, data output from the first one of said terminals being transferred to the second one of said terminals addressed by the communication request through the virtual channel registered in said management table by said virtual channel setting means; and
   virtual channel releasing means for deleting any of said virtual channels from said management table of said management table means satisfying a predetermined condition of virtual channel use within said ATM switching network to release said virtual channels unlikely to be reused.

2. A transmission control system as claimed in claim 1, further comprising timer means for repeatedly measuring a predetermined time, wherein said virtual channel releasing means comprises means for deleting all of said virtual channels from said management table when said timer means indicates the predetermined time, so that all of said virtual channels are released.

3. A transmission control system as claimed in claim 1,
   further comprising count means for counting a number of times that each of said virtual channels registered in said management table has been used and for comparing the number of times obtained for each of said virtual channels with a predetermined number of times, and
   wherein said virtual channel releasing means comprises means for deleting, from said management table, any virtual channel used less than the predetermined number of times.

4. A transmission control system as claimed in claim 1,
   further comprising timer means for measuring a passage of time for each of said virtual channels registered in said management table, the passage of time starting at a last used time when a corresponding virtual channel was last used and ending at a present time, and for comparing the passage of time obtained for each of said virtual channels with a predetermined threshold time, and
   wherein said virtual channel releasing means comprises means for deleting, from said management table, the corresponding virtual channel for each passage of time longer than the predetermined threshold time.

5. A transmission control system as claimed in claim 1,
   further comprising determining means for determining whether said management table has an idle area sufficient to register a new virtual channel, and
   wherein said virtual channel releasing means comprises means for releasing at least one of said virtual channels from said management table when said determining means determines that said management table does not have an idle area sufficient to register the new virtual channel.

6. A transmission control system as claimed in claim 5,
   further comprising count means for counting a number of times that each of said virtual channels registered in said management table has been used and for comparing the number of times obtained for each of said virtual channels with a predetermined number of times, and wherein said means for releasing in said virtual channel releasing means deletes, from said management table, any virtual channel used less than the predetermined number of times.

7. A transmission control system as claimed in claim 5, further comprising timer means for measuring a passage of time for each of said virtual channels registered in said management table, the passage of time starting at a last used time when a corresponding virtual channel was last used and ending at a present time, and for comparing the passage of time obtained for each of said virtual channels with a predetermined threshold time, and wherein said means for releasing in said virtual channel releasing means deletes, from said management table, the corresponding virtual channel for each passage of time longer than the predetermined threshold time.

8. A transmission control system as claimed in claim 1, wherein said management table includes a flag indicating that a corresponding one of said virtual channels is inhibited from being deleted from said management table.

9. A transmission control system as claimed in claim 1, wherein said management table includes a first area for storing an address of each of said terminals related to said virtual channels registered in said management table, and a second area for storing an identification number of each of said virtual channels presently registered in said management table.

10. A transmission control system as claimed in claim 4, wherein said management table includes a first area for storing an address of each of said terminals related to said virtual channels registered in said management table, a second area for storing an identification number of each of said virtual channels presently registered in said management table, and a third area which registers the last used time for each of said virtual channels presently registered.

11. A transmission control system as claimed in claim 1, wherein said data comprises cells, each having a predetermined length of data.

12. A transmission control system as claimed in claim 1, wherein each of said terminal adapters comprises request means for generating a virtual channel setting request when said retrieval means determines that said management table does not have the virtual channel corresponding to the communication request and for sending the virtual channel setting request to said ATM switching network, so that the virtual channel corresponding thereto is formed in said ATM switching network in response to the virtual channel setting request.

13. A transmission control system as claimed in claim 12, wherein:

said ATM switching network comprises formation indication means for informing said virtual channel setting means of formation of the virtual channel corresponding to the virtual channel setting request; and said virtual channel setting means registers formation of the virtual channel in said management table when said virtual channel setting means is informed by said formation indication means.

14. A transmission control system, comprising:

an asynchronous transfer mode (ATM) switching network providing virtual channels;

a plurality of terminals; and a plurality of terminal adapters connected to said ATM switching network and respectively connected to said plurality of terminals, each of said terminal adapters coupling a corresponding one of said terminals to said ATM switching network, data being transferred between any pair of terminals through corresponding terminal adapters from among said terminal adapters and one of said virtual channels in said ATM switching network, each of said terminal adapters including management table means, including a management table, for registering said virtual channels presently formed in said ATM switching network in said management table;

retrieval means for receiving a communication request from a first one of said terminals and for determining whether said management table registers a virtual channel corresponding to the communication request, data output from the first one of said terminals being transferred to a second one of said terminals addressed by the communication request through the virtual channel corresponding to the communication request when said retrieval means determines that said management table has the virtual channel corresponding to the communication request registered therein;

virtual channel setting means for registering the virtual channel corresponding to the communication request in said management table when said retrieval means determines that said management table does not have the virtual channel corresponding to the communication request, data output from the first one of said terminals being transferred to the second one of said terminals addressed by the communication request through the virtual channel registered in said management table by said virtual channel setting means; and virtual channel releasing means for deleting any of said virtual channels from said management table of said management table means satisfying a predetermined condition of virtual channel use within said ATM switching network to release said virtual channels unlikely to be reused.

15. A transmission control system as claimed in claim 14, wherein each of said terminal adapters comprises timer means for repeatedly measuring a predetermined time, and wherein said virtual channel releasing means comprises means for deleting all of said virtual channels form said management tale when said timer means indicates the predetermined time, so that all of said virtual channels are released.

16. A transmission control system as claimed in claim 14, wherein each of said terminal adapter means comprises count means for counting an number of times that each of said virtual channels registered in said management table has been used and for comparing the number of times obtained for each of said virtual channels with a predetermined number of times, and wherein said virtual channel releasing means comprises means for deleting, from said management table, any virtual channel used less than the predetermined number of times.

17. A transmission control system as claimed in claim 14,
wherein each of said terminal adapters comprises timer means for measuring a passage of time for each of said virtual channels registered in said management table, the passage of time starting at a last used time when a corresponding virtual channel was last used and ending at a present time, and for comparing the passage of time obtained for each of said virtual channels with a predetermined threshold time, and
wherein said virtual channel releasing means comprises means for deleting, from said management table, the corresponding virtual channel for each passage of time greater than the predetermined threshold time.

18. A transmission control system as claimed in claim 14,
wherein each of said terminal adapters comprises determining means for determining whether said management table has an idle area sufficient to register a new virtual channel, and
wherein said virtual channel releasing means comprises means for releasing at least one of said virtual channels from said management table when said determining means determines that said management table does not have an idle are sufficient to register the new virtual channel.

19. A transmission control system as claimed in claim 18,
wherein each of said terminal adapters comprises count means for counting a number of times that each of said virtual channels registered in said management table has been used and for comparing the number of times obtained for each of said virtual channels with a predetermined number of times, and
wherein said means for releasing in said virtual channel releasing means deletes, from said management table, any virtual channel used less than the predetermined number of times.

20. A transmission control system as claimed in claim 18,
wherein each of said terminal controllers comprises timer means for measuring a passage of time from a time when each of said virtual channels registered in said management table was last used and for comparing the passage of time obtained for each of said virtual channels with a predetermined threshold time, and
wherein said means for releasing in said virtual channel releasing means deletes, from said management table, a virtual channel for each passage of time longer than the predetermined threshold time.

21. A transmission control system as claimed in claim 14, wherein said management table includes a flag indicating that a corresponding one of said virtual channels in inhibited from being deleted from said management table.

22. A transmission control system as claimed in claim 14, wherein said management table includes a first area for storing an address of each of said terminals related to said virtual channels registered in said management table, and a second area for storing an identification number of each of said virtual channels registered in said management table at present.

23. A transmission control system as claimed in claim 19, wherein said management table includes a first area for storing an address of each of said terminals related to said virtual channels registered in said management table, a second area for storing an identification number of each of said virtual channels registered in said management table at present, and a third area for storing a last used time for each of said virtual channels presently registered.

24. A transmission control system as claimed in claim 14, wherein said data comprises cells, each having a predetermined length of data.

25. A transmission control system as claimed in claim 14, wherein each of said terminal adapters comprises request means for generating a virtual channel setting request when said retrieval means determines that said management table does not have the virtual channel corresponding to the communication request and for sending said virtual channel setting request to said ATM switching network, so that the virtual channel corresponding thereto is formed in said ATM switching network in response to the virtual channel setting request.

26. A transmission control system as claimed in claim 25, wherein:
said ATM switching network comprises formation indication means for informing the virtual channel setting means of formation of the virtual channel corresponding to said virtual channel setting request; and
said virtual channel setting means registers formation of the virtual channel in said management table when said virtual channel setting means is formed by said formation indication means.

27. A transmission control system comprising:
a plurality of terminals;
a plurality of terminal adapters respectively connected to said plurality of terminals; and
an asynchronous transfer mode (ATM) switching network connected to said terminal adapters, providing virtual channels, each of said terminal adapters coupling a corresponding one of said terminals to said ATM switching network, data being transferred between a pair of said terminals through two corresponding terminal adapters from among said terminal adapters and one of said virtual channels in said ATM switching network, said ATM switching network including
management table means, including a management table, for registering said virtual channels presently formed in said ATM switching network in said management table;
retrieval means for receiving a communication request from a first one of said terminals and for determining whether said management table presently registers a virtual channel corresponding to the communication request, data output from the first one of said terminals being transferred to a second one of said terminals addressed by the communication request through the virtual channel corresponding to the communication request and the two corresponding terminal adapters corresponding to the first and second ones of said terminals when said retrieval means determines that said management table has the virtual channel corresponding to the communication request registered therein;
virtual channel setting means for registering the virtual channel corresponding to said communication request in the management table when said retrieval means determines that said management table does not have the virtual channel corresponding to the communication request, data output from the first one of said terminals being transferred to the second one of said terminals addressed by the communication request through the virtual channel registered in said management table by said virtual channel setting means; and virtual channel releasing means for deleting any of said virtual channels from said management table of said management table means satisfying a predetermined condition of virtual channel use within said ATM switching network to release said virtual channels unlikely to be reused.

28. A transmission control system as claimed in claim 27, wherein said ATM switching network comprises timer mean for repeatedly measuring a predetermined time, and wherein said virtual channel releasing means comprises means for deleting all of said virtual channels from said management table when said timer means indicates the predetermined time, so that all of said virtual channels are released.

29. A transmission control system as claimed in claim 27, wherein said ATM switching network comprises count means for counting a number of times that each of said virtual channels registered in said management table has been used and for comparing the number of times obtained for each of said virtual channels with a predetermined number of times, and wherein said virtual channel releasing means comprises means for deleting, from said management table, any virtual channel used less than the predetermined number of times.

30. A transmission control system as claimed in claim 27, wherein said ATM switching network comprises timer means for measuring a passage of time for each of said virtual channels registered in said management table, the passage time starting when a corresponding virtual channel was last used and for comparing the passage time obtained for each of said virtual channels with a predetermined threshold time, and wherein said virtual channel releasing means comprises means for deleting, from said management table, the corresponding virtual channel for each passage time longer than the predetermined threshold time.

31. A transmission control system as claimed in claim 27, wherein said ATM switching network comprises determining means for determining whether said management table has an idle area sufficient to register a new virtual channel, and wherein said virtual channel releasing means comprises means for releasing at least one of said virtual channels from said management table when said determining means determines that said management table does not have an idle are sufficient to register a new virtual channel.

32. A transmission control system as claimed in claim 31, wherein said ATM switching network comprises count mean for counting a number of times that each of said virtual channels registered in said management table has been used and for comparing the number of times obtained for each of said virtual channels with a predetermined number of times, and wherein said means for releasing in said virtual channel releasing means deletes, from said management table, any virtual channel used less that the predetermined number of times.

33. A transmission control system as claimed in claim 31, wherein said ATM switching network comprises timer means for measuring a passage of time for each of said virtual channels registered in said management table, the passage of time starting at a last used time when a corresponding virtual channel was last used and ending at a present time, and for comparing the passage of time obtained for each of said virtual channels with a predetermined threshold time, and wherein said means for releasing in said virtual channel releasing means deletes, from said management table, the corresponding virtual channel for each passage of time greater than the predetermined threshold time.

34. A transmission control system as claimed in claim 27, wherein said management table includes a flag indicating that a corresponding one of said virtual channels is inhibited from being deleted from said management table.

35. A transmission control system as claimed in claim 27, wherein said management table includes a first area for storing an address of each of said terminals related to said virtual channels registered in said management table, and a second area for storing an identification number of each of said virtual channels presently registered in said management table.

36. A transmission control system as claimed in claim 31, wherein said management table includes a first area for storing an address of each of said terminals related to said virtual channels registered in said management table, a second area for storing an identification number of each of said virtual channels presently registered in said management table, and a third area which registers the last used time for each of said virtual channels presently registered.

37. A transmission control system as claimed in claim 27, wherein said data comprises cells, each having a predetermined length of data.

38. A transmission control system as claimed in claim 27, wherein each of said terminals comprises request means for generating a virtual channel notice request subsequent to the communication request and for sending the virtual channel notice request to said ATM switching network, and wherein said ATM switching network comprises means for sending back each said terminal information about the virtual channel obtained by said control means in response to the virtual channel notice request.

39. A transmission control system as claimed in claim 38, wherein when said retrieval means determines that said management table does not have the virtual channel corresponding to said communication request, said virtual channel setting means registers the virtual channel corresponding to the communication request in said management table.

40. A transmission control system for an asynchronous transfer mode switching network providing virtual channels to connect terminals together, comprising:
- a management table for storing channel identifiers of the virtual channels formed by the asynchronous transfer mode switching network;
- retrieval means for receiving a communication request for a communication channel from a first terminal to a second terminal and for determining whether said management table includes an identifier for the communication channel among the channel identifiers stored therein, data from the first terminal being transmitted to the second terminal addressed by the communication request through the communication channel when said retrieval means determines that said management table includes the identifier for the communication channel;
- virtual channel setting means for sending the identifier for the communication channel to said management table when said retrieval means determines that said management table does not include the identifier for the communication channel, data from the first terminal being transmitted to the second terminal addressed by the communication request through the communication channel after the identifier therefore is stored in said management table; and
- virtual channel releasing means for deleting at least one of the channel identifiers from said management table satisfying a predetermined condition of virtual channel use to release the channel identifiers of said virtual channels unlikely to be reused.

41. A transmission control system as claimed in claim 40, further comprising determining means for determining whether said management table has an idle area sufficient to register a new virtual channel, and wherein said virtual channel releasing means releases at least one of said virtual channels from said management table when said management table does not have an idle area sufficient to register the new virtual channel.

42. A method for controlling the transmission of data between terminals through an asynchronous transfer mode switching network providing virtual channels, comprising the steps of:
(a) receiving a communication request for a communication channel from a first terminal to communicate with a second terminal;
(b) determining whether the communication channel is identified in a management table containing channel identifiers for all presently providing virtual channels;
(c) storing an identifier for the communication channel in the management table when the identifier for the communication channel is not in the management table;
(d) transferring data from the first terminal to the second terminal through the communication channel when the identifier for the communication channel is store din the management table after either of steps (b) and (c); and
(e) releasing the virtual channels when a predetermined condition of virtual channel use within the asynchronous transfer mode switching network is satisfied.

43. A method of controlling the transmission of data as claimed in claim 42, wherein step (e) comprises releasing the virtual channels when the management table does not have an idle area sufficient to register a new virtual channel.

* * * * *

UNITED STATES PATENT AND TRADEMARK OFFICE
CERTIFICATE OF CORRECTION

PATENT NO.   :   5,067,123
DATED        :   NOVEMBER 19, 1991
INVENTOR(S)  :   RYUJI HYODO ET AL.

It is certified that error appears in the above-identified patent and that said Letters Patent is hereby corrected as shown below:

TITLE PAGE [57] ABSTRACT, Line 8, "request." should be --request and a releasing part for releasing virtual channels which satisfy a predetermined condition of use of the virtual channels within the network.--;

Line 19, "tabele," should be --table,--.

Col. 4,   line 24, "1-n" should be --1'-n--.

Col. 7,   line 19, "the ATM" should be --and the ATM--.

Col. 16,  line 53, "form" should be --from--; and "tale" should be --table--.

Col. 17,  line 27, "are" should be --area--;
          line 58, "in" should be --is--.

Col. 19,  line 18, "mean" should be --means--.

Col. 22,  line 27, "store din" should be --stored in--.

Signed and Sealed this

Fourth Day of May, 1993

*Attest:*

MICHAEL K. KIRK

*Attesting Officer*    Acting Commissioner of Patents and Trademarks